(12) United States Patent
Shahmohammadian et al.

(10) Patent No.: US 11,876,742 B2
(45) Date of Patent: Jan. 16, 2024

(54) METHOD AND APPARATUS FOR ENHANCING SRS FLEXIBILITY, COVERAGE, AND CAPACITY IN A COMMUNICATION SYSTEM

(71) Applicant: Samsung Electronics Co., Ltd., Gyeonggi-do (KR)

(72) Inventors: Hoda Shahmohammadian, San Diego, CA (US); Jung Hyun Bae, San Diego, CA (US); Jungwon Lee, San Diego, CA (US)

(73) Assignee: Samsung Electronics Co., Ltd

( * ) Notice: Subject to any disclaimer, the term of this patent is extended or adjusted under 35 U.S.C. 154(b) by 117 days.

(21) Appl. No.: 17/329,735

(22) Filed: May 25, 2021

(65) Prior Publication Data

US 2022/0029861 A1 Jan. 27, 2022

Related U.S. Application Data

(60) Provisional application No. 63/162,805, filed on Mar. 18, 2021, provisional application No. 63/133,585, (Continued)

(51) Int. Cl.
*H04L 5/00* (2006.01)
*H04W 8/24* (2009.01)
(Continued)

(52) U.S. Cl.
CPC .......... *H04L 5/0048* (2013.01); *H04L 5/0051* (2013.01); *H04L 5/0053* (2013.01);
(Continued)

(58) Field of Classification Search
CPC ... H04L 5/0048; H04L 5/0051; H04L 5/0096; H04L 25/0224; H04W 8/24;
(Continued)

(56) References Cited

U.S. PATENT DOCUMENTS

| 2014/0003262 A1* | 1/2014 | He | H04W 36/22 |
| | | | 370/252 |
| 2020/0053728 A1* | 2/2020 | Huang | H04L 27/26025 |

(Continued)

FOREIGN PATENT DOCUMENTS

| WO | WO 2019/037158 | 2/2019 | |
| WO | WO-2021216706 A1 * | 10/2021 | ............. H04L 5/001 |

OTHER PUBLICATIONS

ZTE, "Preliminary Views on Further Enhancement for NR MIMO", R1-2003483, 3GPP TSG RAN WG1 Meeting #101-e, May 25-Jun. 5, 2020, 18 pages.

(Continued)

*Primary Examiner* — Redentor Pasia
(74) *Attorney, Agent, or Firm* — The Farrell Law Firm, P.C.

(57) ABSTRACT

A method and apparatus are provided for wireless communication between a base station and a user equipment (UE). A base station apparatus includes a transceiver; and a processor configured to transmit, to the UE, via the transceiver, a control message configured for the UE, and receive, via the transceiver, a sounding reference signal (SRS) from the UE, based on the control message. The control message indicates a triggering slot offset and an available slot to the UE for the SRS transmission.

24 Claims, 6 Drawing Sheets

Related U.S. Application Data filed on Jan. 4, 2021, provisional application No. 63/062,508, filed on Aug. 7, 2020, provisional application No. 63/062,772, filed on Aug. 7, 2020, provisional application No. 63/056,926, filed on Jul. 27, 2020.

(51) Int. Cl.
| | |
|---|---|
| *H04W 72/0446* | (2023.01) |
| *H04L 25/02* | (2006.01) |
| *H04W 24/02* | (2009.01) |
| *H04W 72/23* | (2023.01) |
| *H04W 72/50* | (2023.01) |

(52) U.S. Cl.
CPC ........ *H04L 5/0096* (2013.01); *H04L 25/0224* (2013.01); *H04W 8/24* (2013.01); *H04W 24/02* (2013.01); *H04W 72/0446* (2013.01); *H04W 72/23* (2023.01); *H04W 72/535* (2023.01)

(58) Field of Classification Search
CPC ............... H04W 24/02; H04W 72/042; H04W 72/0446; H04W 72/1257; H04W 72/1289; H04W 72/0493
See application file for complete search history.

(56) References Cited

U.S. PATENT DOCUMENTS

| | | | | |
|---|---|---|---|---|
| 2020/0107345 | A1* | 4/2020 | Ang | H04L 1/0026 |
| 2020/0204407 | A1* | 6/2020 | Liu | H04L 25/0226 |
| 2020/0228196 | A1* | 7/2020 | John Wilson | H04B 7/2656 |
| 2020/0322187 | A1* | 10/2020 | He | H04W 72/0446 |
| 2020/0412581 | A1* | 12/2020 | Zhang | H04L 5/0094 |
| 2020/0412582 | A1* | 12/2020 | Manolakos | H04W 72/0466 |
| 2021/0168853 | A1* | 6/2021 | Um | H04W 72/23 |
| 2021/0367727 | A1* | 11/2021 | Go | H04L 5/0048 |
| 2021/0409178 | A1* | 12/2021 | Faxér | H04W 72/1273 |
| 2022/0029764 | A1* | 1/2022 | Liou | H04L 5/0094 |
| 2022/0312440 | A1* | 9/2022 | Bagheri | H04W 72/044 |
| 2022/0330300 | A1* | 10/2022 | Wang | H04W 72/0406 |

OTHER PUBLICATIONS

Samsung, "On Rel.17 FeMIMO WI", R1-2003918, 3GPP TSG RAN WG1 #101, May 25-Jun. 5, 2020, 12 pages.
European Search Report dated Dec. 9, 2021 issued in counterpart application No. 21180299.6-1205, 9 pages.
3rd Generation Partnership Project; Technical Specification Group Radio Access Network; NR; Physical channels and modulation (Release 16) (Dec. 2020).
3rd Generation Partnership Project; Technical Specification Group Radio Access Network; NR; Physical layer procedures for data (Release 16) (Dec. 2020).

* cited by examiner

METHOD AND APPARATUS FOR ENHANCING SRS FLEXIBILITY, COVERAGE, AND CAPACITY IN A COMMUNICATION SYSTEM

PRIORITY

This application is based on and claims priority under 35 U.S.C. § 119(e) to U.S. Provisional Patent Application Nos. 63/162,805, 63/133,585, 63/062,772, 63/062,508, and 63/056,926, which were filed in the United States Patent and Trademark Office on Mar. 18, 2021, Jan. 4, 2021, Aug. 7, 2020, Aug. 7, 2020, and Jul. 27, 2020, respectively, the entire content of each of which is incorporated herein by reference.

FIELD

The present disclosure relates generally to new radio (NR) multiple input multiple output (MIMO) enhancement, and more particularly, to enhancing the capacity and coverage of sounding reference signal (SRS) transmission through SRS time bundling, increased SRS repetition, and partial sounding across frequency.

BACKGROUND

As 5th generation (5G) NR MIMO proceeds towards commercialization, various aspects have been identified that still require further enhancements from the perspective of real deployment scenarios. One such aspect includes enhancement of SRS transmission targeting different frequency ranges.

For example, faced with increased demand for SRS resources for multi-panel transmission and due to the use of SRSs for various scenarios, an SRS should be further enhanced at least for flexibility, capacity, and coverage. Further, with an increase of the number of user equipment (UE) antennas, additional procedures for antenna switching configurations for down link (DL) channel state information (CSI) acquisition are required.

SUMMARY

Accordingly, the present disclosure is designed to address at least the problems and/or disadvantages described above and to provide at least the advantages described below.

An aspect of the present disclosure is to provide a method and apparatus, which facilitate more flexible triggering and downlink control information (DCI) overhead reduction.

Another aspect of the present disclosure is to provide different antenna switching configurations with increased numbers of antennas, e.g., eight antennas.

Another aspect of the present disclosure is to provide mechanisms for enhancing the capacity and coverage of SRS transmission through SRS time bundling, increased SRS repetition, and partial sounding across frequency.

In accordance with an aspect of the disclosure, a base station apparatus is provided for wireless communication with a user equipment (UE). The base station apparatus includes a transceiver; and a processor configured to transmit, to the UE, via the transceiver, a control message configured for the UE, and receive, via the transceiver, a sounding reference signal (SRS) from the UE, based on the control message. The control message indicates a triggering slot offset and an available slot to the UE for the SRS transmission.

In accordance with another aspect of the disclosure, a user equipment (UE) apparatus is provided for wireless communication with a base station. The UE apparatus includes a transceiver; and a processor configured to receive, from the base station, via the transceiver, a control message configured for the UE, and transmit, via the transceiver, a sounding reference signal (SRS) to the base station, based on the control message. The control message indicates a triggering slot offset and an available slot to the UE for the SRS transmission.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
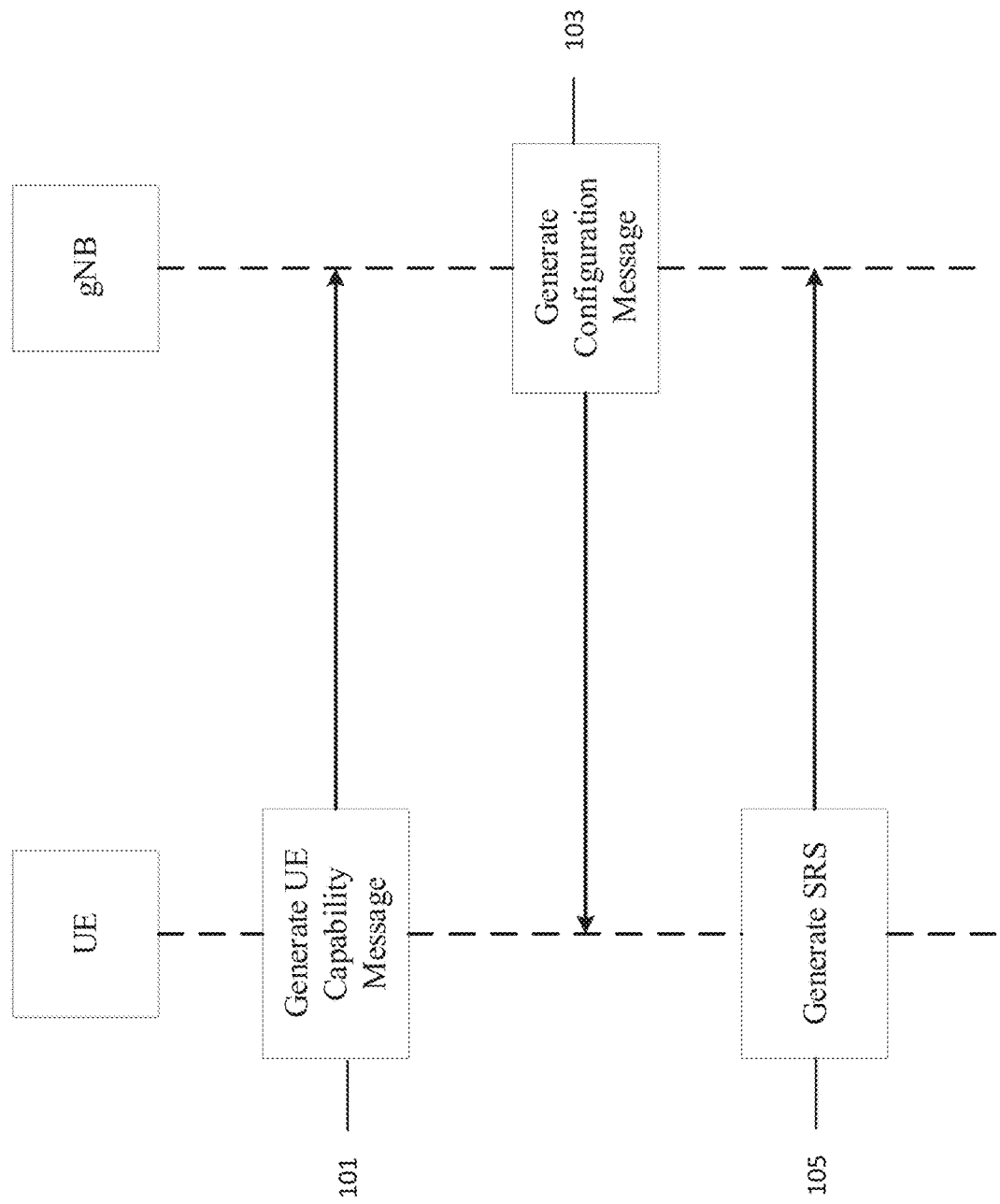
FIG. 1 illustrates a method for transmitting an SRS according to an embodiment.

Hereinafter, various embodiments of the disclosure are described in detail with reference to the accompanying drawings. It should be noted that the same elements will be designated by the same reference numerals although they are shown in different drawings. In the following description, specific details such as detailed configurations and components are merely provided to assist with the overall understanding of the embodiments of the present disclosure. Therefore, it should be apparent to those skilled in the art that various changes and modifications of the embodiments described herein may be made without departing from the scope of the present disclosure. In addition, descriptions of well-known functions and constructions are omitted for clarity and conciseness. The terms described below are terms defined in consideration of the functions in the present disclosure, and may be different according to users, intentions of the users, or customs. Therefore, the definitions of the terms should be determined based on the contents throughout this specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the scope of the present disclosure.

Although the terms including an ordinal number such as first, second, etc., may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms used herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate existence of a feature, a number, a step, an operation, a structural element, parts, or a combination thereof, and do not exclude the existence or probability of the addition of one or more other features, numerals, steps, operations, structural elements, parts, or combinations thereof.

Unless defined differently, all terms used herein have the same meanings as those understood by a person skilled in the art to which the present disclosure belongs. Terms such as those defined in a generally used dictionary are to be interpreted to have the same meanings as the contextual meanings in the relevant field of art, and are not to be interpreted to have ideal or excessively formal meanings unless clearly defined in the present disclosure.

An electronic device according to an embodiment may be one of various types of electronic devices. The electronic devices may include, for example, a portable communication device (e.g., a smart phone), a computer, a portable multimedia device, a portable medical device, a camera, a wearable device, or a home appliance. According to an embodiment of the disclosure, an electronic device is not limited to those described above.

The terms used in the present disclosure are not intended to limit the present disclosure but are intended to include various changes, equivalents, or replacements for a corresponding embodiment. With regard to the descriptions of the accompanying drawings, similar reference numerals may be used to refer to similar or related elements. A singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, terms such as "1$^{st}$," "2nd," "first," and "second" may be used to distinguish a corresponding component from another component, but are not intended to limit the components in other aspects (e.g., importance or order). It is intended that if an element (e.g., a first element) is referred to, with or without the term "operatively" or "communicatively", as "coupled with," "coupled to," "connected with," or "connected to" another element (e.g., a second element), it indicates that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," and "circuitry." A module may be a single integral component, or a minimum unit or part thereof, adapted to perform one or more functions. For example, a module may be implemented in a form of an application-specific integrated circuit (ASIC).

FIG. 1 illustrates a method for transmitting an SRS according to an embodiment. Specifically, FIG. 1 illustrates a signal flow diagram of a process performed between a UE and a gNB.

Referring to FIG. 1, in step 101, the UE generates and transmits a UE capability message to the gNB. For example, the UE capability message may indicate the transmission capability for each port of the UE, e.g., transmission capability on a per-port basis. The UE capability message may indicate a number of ports of the UE, a number of antennas of the UE, a transmission capability for each port, etc. The UE capability report may indicate the number of transmit/receive paths of the UE.

In step 103, the gNB generates a configuration message and transmit the generated configuration message to the UE. The configuration message may be based, at least in some respects, on the UE capability message. For example, the configuration message may indicate a UL MIMO configuration for the UE, the number of spatial streams or layers for the UE to use for the UL MIMO communications, a transmission configuration for the UE to use, etc.

Thereafter, in step 105, the UE generates and transmits an SRS to the gNB based on the received configuration message.

In NR MIMO, key parameters used to configure a frequency domain position of an SRS are included within a freqHopping parameter structure (i.e., $C_{SRS}$, $B_{SRS}$, and $b_{hop}$), freqDomainPosition (i.e., $n_{RRC}$), FreqDomainShift (i.e., $n_{shift}$), and TransmissionComb (i.e., $K_{TC}$, $\bar{k}_{TC}$, and $n_{SRS}^{cs}$).

An example of the freqHopping parameter structure is provided in Table 1 below, which assumes $C_{SRS}=30$.

TABLE 1

| CsRs | $B_{SRS}=0$ | | $B_{SRS}=1$ | | $B_{SRS}=2$ | | $B_{SRS}=3$ | |
|------|-------------|-----|-------------|-----|-------------|-----|-------------|-----|
| | $m_{SRS,0}$ | $N_0$ | $m_{SRS,1}$ | $N_1$ | $m_{SRS,2}$ | $N_2$ | $m_{SRS,3}$ | $N_3$ |
| 30 | 128 | 1 | 64 | 2 | 32 | 2 | 4 | 8 |

Figure 2:
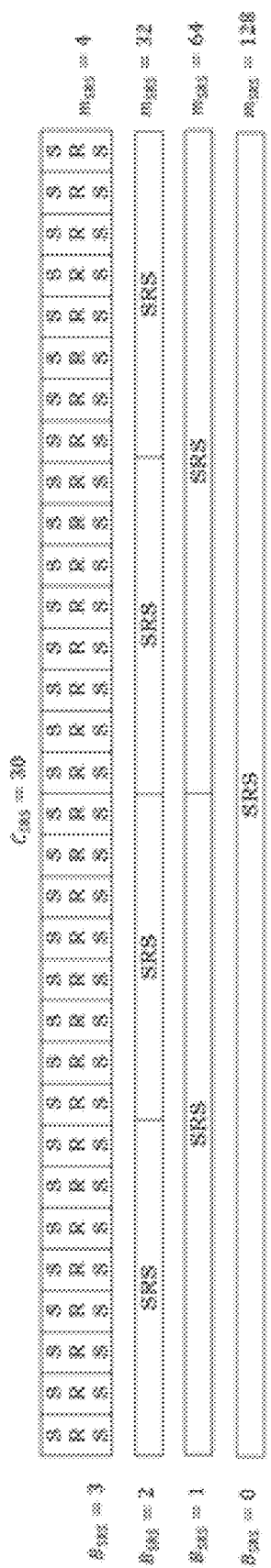
FIG. 2 illustrates SRS resource allocations for $C_{SRS}=30$, according to an embodiment.

In Table 1, the $m_{SRS,b}$ parameter defines the number of resource blocks (RBs) used for the SRS transmission and ranges from 4 to 272 RBs. For $C_{SRS}=30$, the largest resource allocation is $m_{SRS,b}=128$ RBs (i.e., $B_{SRS}=0$). All of the possible resource allocations for $C_{SRS}=30$ are illustrated in FIG. 2.

In the current specification (e.g., 3$^{rd}$ generation partnership project (3GPP) technical specification (TS) 38.211), the frequency domain starting position $k_0^{(p_i)}$ is defined as shown in Equation (1):

$$k_0^{(p_i)} = \bar{k}_0^{(p_i)} + \sum_{b=0}^{B_{SRS}} K_{TC} M_{sc,b}^{SRS} n_b \quad (1)$$

In Equation (1), $p_i$ represents port i and the first part of Equation (1), $\bar{k}_0^{(p_i)}$, may be derived as shown in Equation (2).

$$\bar{k}_0^{(p_i)} = n_{shift} N_{sc}^{RB} + k_{TC}^{(p_i)} \quad (2)$$

$$k_{TC}^{(p_i)} = \begin{cases} (\bar{k}_{TC} + K_{TC}/2) \mod K_{TC} & \text{if } n_{SRS}^{cs}/2, \ldots, n_{SRS}^{cs,max}-1 \} \text{ and } N_{ap}^{SRS} = 4 \text{ and } p_i \in \{1001, 1003\} \\ \bar{k}_{TC} & \text{otherwise} \end{cases}$$

In Equation (2), $n_{shift}$ is a frequency domain shift that adjusts the SRS allocation with respect to a reference point grid and is contained in a higher-layer parameter freqDomainShift. And $N_{sc}^{RB}$ is the number of subcarriers in an RB. $K_{TC}$ is a transmission comb and $\bar{k}_{TC} \in \{0,1,\ldots,K_{TC}-1\}$ is a transmission comb offset that are contained in the higher-layer parameter transmissionComb. $n_{SRS}^{cs} \in \{0,1,\ldots,n_{SRS}^{cs,max}-1\}$ is a transmission comb cyclic shift that is contained in the higher-layer parameter transmissionComb. Vs is the number of SRS ports given by higher-layer parameter nrofSRS-Ports.

Referring again to Equation (1), $B_{SRS}$ is a hopping parameter, as illustrated in FIG. 2, that is contained in the higher-layer parameter freqHopping, and $M_{sc,b}^{SRS}$ is the length of the SRS sequence, as given by Equation (3).

$$M_{sc,b}^{SRS} = m_{SRS,b} N_{sc}^{RB}/K_{TC} \quad (3)$$

In Equation (3), $m_{SRS,b}$, as described above and illustrated in FIG. 2, is derived using a lookup table with given freqHopping parameters $C_{SRS}$ and $B_{SRS}$. Hence, $K_{TC} M_{sc,b}^{SRS}$ corresponds to a total number of subcarriers included in $m_{SRS,b}$ RBs that are used for SRS transmission.

In Equation (1), $n_b$ is a frequency position index that is defined based on freqHopping parameters $B_{SRS}$ and $b_{hop}$. If $b_{hop} \geq B_{SRS}$, frequency hopping is disabled and $n_b$ remains constant unless re-configured. $n_b$ may be defined using Equation (4).

$$n_b = \lfloor 4 n_{RRC}/m_{SRS,b} \rfloor \bmod N_b \quad (4)$$

In Equation (4), $n_{RRC}$ is given by the higher-layer parameter freqDomainPosition, which takes values from 0 to 67, and $4n_{RRC} = 0,\ldots,271$ implies that there can be up to 272 RBs used for SRS. However, the example illustrated in FIG. 2, with $C_{SRS}=30$, only utilizes 128 RBs for SRS.

$N_b$ for $b=B_{SRS}$ is derived using a lookup table given freqHopping parameters. $N_b$ corresponds to the total number of possible SRS locations within $m_{SRS,b-1}$ RBs when $m_{SRS,b}$ RB's are used for SRS transmission.

If $b_{hop} < B_{SRS}$, frequency hopping is enabled and $n_b$ may be defined by Equation (5).

$$n_b = \begin{cases} \lfloor 4n_{RRC}/m_{SRS,b} \rfloor \bmod N_b & b \leq b_{hop} \\ \{F_b(n_{SRS}) + \lfloor 4n_{RRC}/m_{SRS,b} \rfloor\} \bmod N_b & \text{otherwise} \end{cases} \quad (5)$$

In Equation (5), $F_b(n_{SRS})$ may be defined using Equation (6).

In Equation (6), $N_{b_{hop}}=1$ regardless of the value of $N_b$ and $n_{SRS}$ is a count of the number of SRS transmissions. The first line in Equation (5) is time invariant, which implies that hopping does not happen among $N_b$ possible locations corresponding to $b \leq b_{hop}$. Hopping happens within RBs determined by $n_b$s for $b > b_{hop}$. That is, $b_{hop}$ is a parameter indicating a hopping range. The nested structure of the SRS transmission and design of the hopping pattern is motivated by the orthogonal multiplexing possibility of SRS transmissions of multiple users.

For aperiodic SRS, $n_{SRS}$ is given by $n_{SRS}=\lfloor l'/R \rfloor$ within the slot where $l'$ is the SRS symbol index and R is the repetition factor given by the field repetitionFactor contained in the higher-layer parameter resourceMapping.

For periodic or semi-persistent SRS, $n_{SRS}$ is given by Equation (7).

$$n_{SRS} = \left( \frac{N_{slot}^{frame,\mu} n_f + n_{s,f}^{\mu} - T_{offset}}{T_{SRS}} \right) \cdot \left( \frac{N_{symb}^{SRS}}{R} \right) + \left\lfloor \frac{l'}{R} \right\rfloor \quad (7)$$

In Equation (7), for slots that satisfy $(N_{slot}^{frame,\mu} n_f + n_{s,f}^{\mu} - T_{offset}) \bmod T_{SRS}=0$, $T_{SRS}$, which indicates SRS periodicity, and $T_{offset}$, which indicates a slot offset, are configured according to the higher-layer parameter periodicityAndOffset-p or periodicityAndOffset-sp. $N_{symb}^{SRS}$ indicates a number of SRS symbols and is given by higher-layer parameter nrofSymbols. $N_{slot}^{frame,\mu}$ is the number of slots per frame for subcarrier spacing of µ, $n_{s,f}^{\mu}$ is a slot number within a frame for subcarrier spacing of µ, and $n_f$ is a system frame number.

Using Equation (7), 'R' number of consecutive symbols among $N_{symb}^{SRS}$ symbols maintain the same frequency position, hopping is applied across such 'R' symbol chunks, and a frequency position at each instance of periodic transmission will change.

To summarize, the first part of Equation (1) is dependent on freqDomainShift (i.e., $n_{shift}$) that adjusts the SRS allocation with respect to the reference point grid and the transmission comb offset (i.e., $\bar{k}_{TC}$) configured in transmissionComb. The second part of Equation (1) is a summation, which is dependent on transmissionComb (i.e., $K_{TC}$), freqDomainPosition (i.e., $n_{RRC}$), freqHopping parameters (i.e., $C_{SRS}$, $B_{SRS}$ and $b_{hop}$), and a count of number of SRS transmissions $n_{SRS}$.

Flexible SRS Triggering and DCI Overhead/Usage Reduction

In accordance with an embodiment of the disclosure, in order to increase multiplexing capacity, SRS transmission can be enhanced either by a larger transmission comb or by a smaller transmission bandwidth (i.e., $m_{SRS,b}$):

Transmitting the SRS with larger transmission comb size provides the benefit of an increased multiplexing capacity. However, it may degrade the channel estimation performance to some degree especially in frequency selective fading scenarios.

$$F_b(n_{SRS}) = \begin{cases} (N_b/2) \left\lfloor \frac{n_{SRS} \bmod \prod_{b'=b_{hop}}^{b} N_{b'}}{\prod_{b'=b_{hop}}^{b-1} N_{b'}} \right\rfloor + \left\lfloor \frac{n_{SRS} \bmod \prod_{b'=b_{hop}}^{b} N_{b'}}{2 \prod_{b'=b_{hop}}^{b-1} N_{b'}} \right\rfloor & \text{if } N_b \text{ even} \\ \lfloor N_b/2 \rfloor \left\lfloor n_{SRS} / \prod_{b'=b_{hop}}^{b-1} N_{b'} \right\rfloor & \text{if } N_b \text{ odd} \end{cases} \quad (6)$$

Transmitting the SRS across a smaller bandwidth provides a benefit of an increased multiplexing capacity. For example, the multiplexing capacity can be doubled if a UE transmits an SRS with a bandwidth of 64 RBs instead of 128 RBs. However, a smaller SRS bandwidths results in knowledge of the propagation channel across the whole BWP requires multiple SRS transmissions with frequency hopping. For example, a UE would have to transmit the SRS four times when using 32 resource blocks. This increases delay and a risk of out-of-date measurements for fast fading scenarios.

Besides, at a cell edge, UEs experience high path loss and may not have sufficient power to allow reliable detection at the base station for the SRS transmission across a large bandwidth. These UEs can allocate a smaller SRS bandwidth to increase the received power density. As described above, the smaller SRS bandwidth increases delay and a risk of out-of-date measurements if a UE at the cell edge is a high speed UE.

In order to handle the above-described tradeoffs, a base station, e.g., a gNB, should be allowed to configure more flexible frequency location for an SRS. That is, flexible SRS transmission with updated parameters, such as transmissionComb and frail-lopping, may provide more knowledge of the propagation channel.

In accordance with an embodiment of the disclosure, it is more flexible and overhead efficient for the MAC control element (CE) to update the transmissionComb and freqHopping parameters of an SRS transmission.

In accordance with an embodiment of the disclosure, it is more flexible and overhead efficient for the MAC CE to update the usage parameter of an SRS transmission.

Regarding sharing SRS resources between two different usages of "codebook" and "antennaSwitching", for an mTnR scenario in general, where mT represents m transmission antennas and nR represent n reception antennas, if m=n, SRS resource reuse between "codebook" and "antennaSwitching" is already supported. However, if m<n, identification of which UE antennas are used in the SRS resource for "antennaSwitching" is needed for uplink (UL) CSI acquisition because the current specification allows a UE to perform different antenna virtualizations for these two SRS resource sets. Accordingly, methods for ensuring that the UE will use the same virtualization and transmission (Tx) power as that for UL CSI acquisition are provided below.

One method is to add a new option of "antennaSwitching/codebook" as a usage parameter inside SRS-config IE. With this method, a UE would not perform different antenna virtualization for the shared SRS resource set between two different usages of "antennaSwitching" and "codebook".

Another method is an implicit indication of SRS resources in a set that can be shared with the introduction of a new radio resource control (RRC) parameter SRS-PortIndex for those SRS resources. This parameter is optional and may be configured for the SRS resources that can be shared for "antennaSwitching" and "codebook" usages. An example of the parameter is shown in the SRS-Config information element below in Table 2.

TABLE 2

| SRS-Config information element | | |
|---|---|---|
| SRS-Config ::= | SEQUENCE { | |
| ... | | |
| SRS-Resource ::= | SEQUENCE { | |
| srs-ResourceId | , | |
| nrofSRS-Ports | ENUMERATED {port1, ports2, ports4}, | |
| SRS-PortIndex | CHOICE { | |
| port1-Index | ENUMERATED {n0,n1,n2,n3}, | OPTIONAL, |
| ports2-Index | ENUMERATED {n0n1,n0n2,n0n3,n1n2,n1n3,n2n3}, | OPTIONAL, |
| ports4-Index | ENUMERATED {n0n1n2,n0n1n3,n0n2n3,n1n2n3,n10n1n2n3} | OPTIONAL, |
| }, | | |
| ... | | |

Further, transmitting the SRS with larger transmission comb size degrades the channel estimation granularity and performance especially in frequency selective fading scenarios. However, an aperiodic partial sounding across a specific section of a bandwidth part (BWP) can alleviate the issue.

Depending on channel conditions, the BWP section to sound with a partial aperiodic SRS transmission may change overtime. This can be done efficiently by flexibly updating parameters affecting a frequency-domain starting position of a configured SRS transmission. As described above, the frequency-domain starting position $k_0^{(pi)}$ is dependent on transmissionComb, transmissionCombfreqDomainPosition and FreqDomainShift values.

In accordance with an embodiment of the disclosure, it is more flexible and overhead efficient for the MAC CE to update the freqDomainPosition and/or FreqDomainShift parameters of an SRS transmission.

In the current specification, each SRS resource set is configured for a specific use case. However, a large amount of overhead can be avoided if the configured usage of an SRS resource set can be updated flexibly.

Since there are multiple SRS resources for an mTnR antenna switching configuration, when m<n, a UE needs to know which resources of "antennaSwitching" should be reused for UL CSI acquisition.

One option is to always use the pre-determined resources in the set for "codebook" usage. For example, the first resources in the set (i.e., according to resource identifier (ID) order) may be reused for "codebook" usage.

An alternative option is to add one more resource in the set specifically for purpose of "codebook" usage for Rd. 15 functionality. For example, information on which SRS resource in the set corresponds to "codebook" usage can be either explicitly indicated to the UE or implicitly determined by the UE.

An option for implicitly indicating resources for the "codebook" usage is to utilize associated quasi co-located (QCL) information. Here, it is reasonable to assume that all resources with "antennaSwitching" usage have the same associated QCL information. A resource for "codebook" usage can be the first resource among these resources. Another resource for "codebook" usage can be the remaining resources with different associated QCL information.

SRS Antenna Switching: UE Sounding Procedure for DL CSI Acquisition

When a UE is configured with 'antennaSwitching' in the SRS-ResourceSet, the current specification only covers configurations for supported SRS-TxPortSwitch of xTyR, where x,y={1, 2, 4}.

Generally, up to two sets are defined for each scenario of xTyR in order to cover two possible periodic/semi-persistent or aperiodic resource type configurations. The number of resources are defined based on a number of antenna switching events. The number of SRS ports for each resource is defined based on a number of available ports for transmission (i.e., x) in each scenario of xTyR. The UE is configured with a guard period of Y symbols, in which the UE does not transmit any other signal, if the SRS resources of a set are transmitted in the same slot. The guard period is in-between the SRS resources of the set. The value of Y is defined by Table 3 below (Table 6.2.1.2-1 in TS 38.214). Specifically, Table 3 provides examples of a minimum guard period between two SRS resources of an SRS resource set for antenna switching.

As shown in Table 3 below, when the number of required antenna switching is three or more, more than one slot is required to keep one symbol gap between switching events. That is, because SRS symbols can only be located within the last 6 symbols of a slot and with one symbol guard between each two SRS resources, a maximum of three resources may fit in a slot. For example, in a 1T4R scenario, where there are 4 antenna switching events, transmit path switching spans over two slots. This only matters for aperiodic SRS transmission because periodic/semi-persistent SRS configuration allows each resource in a set to be configured with a different slot offset (through higher-layer parameter periodicityAndOffset-p or periodicityAndOffset-sp), while this is not possible for aperiodic SRS resources. Hence, for a 1T4R scenario, two resource sets are required for aperiodic SRS transmission since antenna switching spans over two different slots.

TABLE 3

| μ | Δf = $2^\mu \cdot 15$ [kHz] | Y [symbol] |
|---|---|---|
| 0 | 15 | 1 |
| 1 | 30 | 1 |
| 2 | 60 | 1 |
| 3 | 120 | 2 |

Further, TS 38.214, Section 6.2.1.2 provides:

For 1 T2R, up to two SRS resource sets configured with a different value for the higher layer parameter resourceType in SRS-ResourceSet set, where each set has two SRS resources transmitted in different symbols, each SRS resource in a given set consisting of a single SRS port, and the SRS port of the second resource in the set is associated with a different UE antenna port than the SRS port of the first resource in the same set, or For 2T4R, up to two SRS resource sets configured with a different value for the higher layer parameter resource Type in SRS-ResourceSet set, where each SRS resource set has two SRS resources transmitted in different symbols, each SRS resource in a given set consisting of two SRS ports, and the SRS port pair of the second resource is associated with a different UE antenna port pair than the SRS port pair of the first resource, or For 1 T4R, zero or one SRS resource set configured with higher layer parameter resourceType in SRS Resource-Set set to 'periodic' or 'semi-persistent' with four SRS resources transmitted in different symbols, each SRS resource in a given set consisting of a single SRS port, and the SRS port of each resource is associated with a different UE antenna port, and For 1 T4R, zero or two SRS resource sets each configured with higher layer parameter resourceType in SRS-ResourceSet set to 'aperiodic' and with a total of four SRS resources transmitted in different symbols of two different slots, and where the SRS port of each SRS resource in the given two sets is associated with a different UE antenna port. The two sets are each configured with two SRS resources, or one set is configured with one SRS resource and the other set is configured with three SRS resources.

For 1l=1R, or 2T=2R, or 4T=4R, up to two SRS resource sets each with one SRS resource, where the number of SRS ports for each resource is equal to 1, 2, or 4 . . . "

In order to increase SRS antenna ports to 8, in accordance with an embodiment of the disclosure, new configurations are defined and added for the number of SRS resource sets and resources for the new UE capability supportedSRS-TxPortSwitch xTyR, where x={1, 2, 4} and y={6, 8}.

For xTyR:

If number of antenna switching events $\lceil y/x \rceil$ is less than or equal to $n_l=(\max(l_{offset})+1)/2$, where $l_{offset}$ is the SRS symbols starting position in the time domain, backwards from the end of the slot:

up to two sets with different resourceType should be defined to cover both periodic/semi-persistent or aperiodic resource type configuration $\lceil y/x \rceil$ resources in each set should be defined, where each resource in a set includes x SRS ports, which are different from other resource ports. $\lceil y/x \rceil$ resources are utilized because there are $\lceil y/x \rceil$ possible switching cases (with x transmit and y receive antennas), and with $\lceil y/x \rceil$ resources in a set, each of the $\lceil y/x \rceil$ cases can be covered. The number of SRS ports for each resource is x, because there are x ports available for transmission.

Otherwise:

zero or one set periodic/semi-persistent, zero or $\lceil \lceil y/x \rceil / n_l \rceil$ sets aperiodic because the guard period of 1 symbol is required between two switching events and to cover all $\lceil y/x \rceil$ possible switching cases in this scenario $\lceil \lceil y/x \rceil / n_l \rceil$ aperiodic SRS transmission is required.

A total of $\lceil y/x \rceil$ resources should be defined, where each resource in a set includes x ports. A total of $\lceil y/x \rceil$ resources are utilized because there are $\lceil y/x \rceil$ possible switching cases (with x transmit and y receive antennas). For an aperiodic resource type scenario, distribution of these $\lceil y/x \rceil$ resources among $\lceil \lceil y/x \rceil / n_l \rceil$ sets can be different. That is, each set can be configured with $n_i$ SRS resources, where $n_i=1, \ldots, n_l$ such that $\Sigma_{i=1}^{\lceil \lceil y/x \rceil / n_l \rceil} n_i = \lceil y/x \rceil$. The number of SRS ports for each resource is x because there are x ports available for transmission.

For an aperiodic resource type of xTyR, the total of $\lceil y/x \rceil$ SRS resources transmission spans over $\lceil \lceil y/x \rceil / n_l \rceil$ slots because the guard period of 1 symbol is required between two switching events and there are $\lfloor y/x \rfloor$ switching cases to cover that require $\lceil \lceil y/x \rceil / n_l \rceil$ slots.

For an xTyR scenario, where x={1, 2, 4} and y={6, 8},

If the number of antenna switching events $\lceil y/x \rceil$ is less than or equal to $n_i=(\max(l_{offset})+1)/2$, where $l_{offset}$ is the SRS symbols starting position in the time domain, backwards from the end of the slot:

up to two SRS resource sets configured with a different value for the higher layer parameter resourceType in SRS-ResourceSet set, where each SRS resource set has $\lceil y/x \rceil$ SRS resources transmitted in different symbols, each SRS resource in a given set including x SRS ports. The SRS ports of one resource are associated with different UE antenna ports than the SRS ports of another resource, if y mod x=0, otherwise some of the SRS ports may be shared between resources.

Otherwise, zero or one SRS resource set configured with higher layer parameter resourceType in SRS ResourceSet set to 'periodic' or 'semi-persistent' with NA SRS resources transmitted in different symbols, each SRS resource in a given set including x SRS ports. The SRS ports of one resource are associated with different UE antenna ports than the SRS ports of another resource, if y mod x=0, otherwise some of the SRS ports may be shared between resources, and zero or $\lceil \lceil y/x \rceil/n_I \rceil$ SRS resource sets, each configured with higher layer parameter resourceType in SRS ResourceSet set to 'aperiodic' and with a total of $\lceil y/x \rceil$ SRS resources transmitted in different symbols of $\lceil \lceil y/x \rceil/n_I \rceil$ different slots, and where the SRS ports of each SRS resource in the given $\lceil \lceil y/x \rceil/n_I \rceil$ sets are associated with different UE antenna ports, if y mod x=0, otherwise some of the SRS ports may be shared between resources. Each set can be configured with $n_I$ SRS resources, where $n_i=1, \ldots, n_I$ such that $$\sum_{i=1}^{\lceil \lceil y/x \rceil/n_I \rceil} n_i = \lceil y/x \rceil.$$

For 4T8R:

Up to two sets with different resourceType should be defined to cover both a periodic/semi-persistent or an aperiodic resource type configuration, similar to current specification for xTyR, where x,y={1, 2, 4}.

Two resources in each set should be defined, where each resource in a set includes four SRS ports, which are different from other resource ports. Two resources are utilized because there are two possible switching cases (with 4 transmit and 8 receive antennas), and with two resources in a set, the two cases can be covered. The number of SRS ports for each resource is four because there are four ports available for transmission.

In accordance with an embodiment of the disclosure, for 4T8R, up to two SRS resource sets are configured with a different value for the higher layer parameter resourceType in SRS-ResourceSet set, where each SRS resource set has two SRS resources transmitted in different symbols, each SRS resource in a given set includes four SRS ports, and the SRS ports of the second resource are associated with different UE antenna ports than the SRS ports of the first resource.

For 4T6R:

Up to two sets with different resource Type should be defined to cover both a periodic/semi-persistent or an aperiodic resource type configuration, similar to current specification for xTyR, where x,y={1, 2, 4}.

Two resources in each set should be defined, where each resource in a set includes four SRS ports that may be the same as other resource ports. Two resources are utilized because there are two possible switching cases (with 4 transmit and 6 receive antennas), and with two resources in a set, the two cases can be covered. The number of SRS ports for each resource is four because there are four ports available for transmission.

In this scenario, since y mod x≠0, two different assumptions can be considered. First, this case can be considered as a special case of 4T8R with two of the receive antennas turned off. With this assumption, there are two switching events separate groups of four antennas for transmission, same as 4T8R.

Therefore, in accordance with an embodiment of the disclosure, for 4T6R, up to two SRS resource sets are configured with a different value for the higher layer parameter resourceType in SRS-ResourceSet set, where each SRS resource set has two SRS resources transmitted in different symbols, each SRS resource in a given set including four SRS ports, and the SRS ports of the second resource is associated with different UE antenna ports than the SRS ports of the first resource.

The second assumption for this case is that the switching events has two antenna ports in common. With this assumption, a pair of antenna ports in two SRS resources of a given set should be shared.

Therefore, in accordance with an embodiment of the disclosure, for 4T6R, up to two SRS resource sets are configured with a different value for the higher layer parameter resourceType in SRS-ResourceSet set, where each SRS resource set has two SRS resources transmitted in different symbols, each SRS resource in a given set includes four SRS ports, and a pair of SRS ports of the second resource is associated with same UE antenna ports as the SRS ports of the first resource.

For 2T8R:

Zero or one set periodic/semi-persistent, zero or two sets aperiodic because the guard period of 1 symbol is required between two switching events and to cover all four possible switching cases. In this scenario, two aperiodic SRS transmissions are required, assuming max $(l_{offset})$=5.

A total of four resources should be defined, where each resource in a set includes two ports. A total of four resources are utilized because there are four possible switching cases (with transmit and 8 receive antennas). For an aperiodic resource type scenario, distribution of these four resources among two sets can be different (i.e., either each set is configured with two SRS resources, or one set is configured with one SRS resource and the other set is configured with three SRS resources assuming max $(l_{offset})$=5). The number of SRS ports for each resource is two because there are two ports available for transmission.

For an aperiodic resource type of 2T8R, resources are transmitted in two slots because the guard period of 1 symbol is required between two switching events and there are four switching cases to cover, which that require two slots, assuming max $(l_{offset})$=5.

In accordance with an embodiment of the disclosure, for 2T8R, zero or one SRS resource set configured with higher layer parameter resource Type in SRS-ResourceSet set to 'periodic' or 'semi-persistent', with four SRS resources transmitted in different symbols, each SRS resource in a given set including two SRS ports, and the SRS port of each resource is associated with different UE antenna ports.

For 2T8R, assuming max $(l_{offset})$=5, zero or two SRS resource sets are utilized, each configured with higher layer parameter resourceType in SRS-ResourceSet set to 'aperiodic' and with a total of four SRS resources transmitted in different symbols of two different slots, and each SRS resource in a given set including two SRS ports, where the SRS ports of each SRS resource in the given four sets are associated with different UE antenna ports. The two sets are each configured with two SRS resources, or one set is configured with one SRS resource and the other set is configured with three SRS resources.

For 2T6R:

Up to two sets with different resourceType should be defined to cover both a periodic/semi-persistent or an aperiodic resource type configuration, similar to current specification for xTyR, where x,y={11, 2, 4}.

Three resources in each set should be defined, where each resource in a set includes two SRS ports that are different from other resource ports. Three resources are utilized because there are three possible switching cases (with 2 transmit and 6 receive antennas), and with three resources in a set, the three cases can be covered. The number of SRS port for each resource is two because there are two ports available for transmission.

In accordance with an embodiment of the disclosure, for 2T6R, up to two SRS resource sets are configured with a different value for the higher layer parameter resourceType in SRS-ResourceSet set, where each SRS resource set has three SRS resources transmitted in different symbols, each SRS resource in a given set includes two SRS ports, and the SRS port pair of the second resource is associated with a different UE antenna port pair than the SRS port pair of the first resource.

For 1 T6R:

Zero or one set periodic/semi-persistent, zero or two sets aperiodic because the guard period of 1 symbol is required between each two switching events and to cover all six possible switching cases. In this scenario, two aperiodic SRS transmission is required, assuming max ($l_{offset}$)=5.

A total of six resources should be defined, where each resource in a set include one port. A total of six resources are utilized because there are six possible switching cases (with 1 transmit and 6 receive antennas). For an aperiodic resource type scenario, each set is configured with three SRS resources, assuming max ($l_{offset}$)=5. The number of SRS ports for each resource is one because there is one port available for transmission.

For an aperiodic resource type of 1T6R, resources are transmitted in two slots because the guard period of 1 symbol is required between two switching events and there are six switching cases to cover, which requires three slots, assuming max ($l_{offset}$)=5 In accordance with an embodiment of the disclosure, for 1T6R, zero or one SRS resource set is configured with higher layer parameter resourceType in SRS ResourceSet set to 'periodic' or 'semi-persistent' with six SRS resources transmitted in different symbols, each SRS resource in a given set includes a single SRS port, and the SRS port of each resource is associated with a different UE antenna port.

For 1T6R, assuming max ($l_{offset}$)=5, zero or two SRS resource sets are utilized, each configured with higher layer parameter resourceType in SRS-ResourceSet set to 'aperiodic' and with a total of six SRS resources transmitted in different symbols of two different slots, and where the SRS port of each SRS resource in the given set is associated with a different UE antenna port. The two sets are each configured with three SRS resources.

For 1T8R:

Zero or one set periodic/semi-persistent, zero or three sets aperiodic because the guard period of 1 symbol is required between each two switching events and to cover all eight possible switching cases. In this scenario, three aperiodic SRS transmissions are required, assuming max ($l_{offset}$)=5.

A total of eight resources should be defined, where each resource in a set includes one port. A total of eight resources are utilized because there are eight possible switching cases (with 1 transmit and 8 receive antennas). For an aperiodic resource type scenario, two sets are configured with three SRS resources and the other set is configured with two SRS resources, assuming max ($l_{offset}$)=5. The number of SRS ports for each resource is one because there is one ports available for transmission.

For an aperiodic resource type of 1T8R, resources are transmitted in three slots because the guard period of 1 symbol is required between two switching events, and there are eight switching cases to cover, which require three slots, assuming max ($l_{offset}$)=5.

In accordance with an embodiment of the disclosure, for 1T8R, zero or one SRS resource set is configured with higher layer parameter resourceType in SRS ResourceSet set to 'periodic' or 'semi-persistent' with eight SRS resources transmitted in different symbols, each SRS resource in a given set including a single SRS port, and the SRS port of each resource is associated with a different UE antenna port.

For 1T8R, assuming max ($l_{offset}$)=5, zero or three SRS resource sets are utilized, each configured with higher layer parameter resourceType in SRS-ResourceSet set to 'aperiodic' and with a total of eight SRS resources transmitted in different symbols of three different slots, and where the SRS port of each SRS resource in the given three sets is associated with a different UE antenna port. Two sets are configured with three SRS resources and the other set is configured with two SRS resources.

For aperiodic SRS antenna switching, due to the symbol gap and set-level slot offset restriction, the overhead of an SRS aperiodic resource set configuration may be very high.

Therefore, in accordance with an embodiment of the disclosure, to reduced overhead associated with the SRS aperiodic resource sets, a new higher layer parameter may be introduced for resource-level slot offset for SRS resources inside an aperiodic SRS resource set with usage of "antennaSwitching". This is an additional slot offset that is configured for each resource individually on top of the configured set level slot offset and can reduce the overhead of an aperiodic SRS set configuration as well as the latency of antenna switching procedure.

For example, an aperiodic SRS set id RRC configured and then DCI or a MAC CE structure is used to activate resources of that aperiodic SRS set, each with an individual additional slot offset.

To illustrate, in the description below, the DCI indicated triggering slot offset can be a sequence of slot offsets for the configured resources in that aperiodic SRS set.

Further, to reduce the potential high overhead of SRS resources and facilitate high UE power efficiency, Rel. 16 allows for the configuration of SRS resources with downgrading configuration with new UE capability reporting. For example, a UE supporting 4T4R can also support SRS transmission of 1T1R and 2T2R in order to save uplink resources. However, in order to increase the number of SRS antenna ports to 8 in Rel. 17, a new UE capability parameter supportedSRS-TxPortSwitch xTyR for x={1, 2, 4} and y={6, 8} should be defined.

In accordance with an embodiment of the disclosure, for an xTyR scenario with x={1,2,4} and y={6,8}, a gNB should be able to configure a downgrading configuration of an SRS for antenna switching with allowing new UE capability design for SRS antenna switching as follows.

{t1r1, t1r2, t1r6}
{t1r1, t1r2, t2r2, t2r6}
{t1r1, t1r2, t2r2, t1r6, t2r6}
{t1r1, t1r2, t1r4, t1r8}
{t1r1, t1r2, t2r2, t2r4, t4r4, t1r8}
{t1r1, t1r2, t2r2, t1r4, t2r4, t1r8, t2r8, t4r8}

This is in conjunction with the existing Rel. 16 UE capability (i.e. {t1r1, t1r2}, {t1r1, t1r2, t1r4}, {t1r1, t1r2, t2r2, t2r4}, {t1r1, t2r2}, {t1r1, t2r2, t4r4}, {t1r1, t1r2, t2r2, t1r4, t2r4}.

Flexible Antenna Switching

Conventionally, a gNB can only enable one type of Tx/Rx antenna switching at one time through an RRC configuration (e.g., either 1T2R or 2T4R). If the gNB determines that a downgraded antenna switching configuration (e.g., 1T2R) suffers large performance loss, the gNB has to reconfigure the RRC to enable the highest possible configuration (e.g., 2T4R). To avoid the potential performance loss caused by channel variation and the cost of having to perform RRC reconfiguration, the gNB rarely chooses to configure the downgraded antenna switching and the whole intention of introducing combined capability is defeated.

In attempt to address this issue, the gNB may configure multiple resource sets following Rel. 15/16 and a UE selects the correct resource set based on a dynamic indication of specific configuration through MAC CE or DCI. This method, however, still may not be efficient in terms of resource overhead.

Therefore, in accordance with an embodiment of the disclosure, an alternative is to introduce a new optional RRC parameter only for antenna switching usage that would allow RRC configured downgraded SRS resource set with specific number of antenna ports, as will be described below. With this new additional RRC parameter, the gNB can then use MAC CE or DCI to dynamically select/activate a downgraded configuration.

TABLE 4

| SRS-Config information element | |
|---|---|
| SRS-Config ::= | SEQUENCE { |
| ... | |
| SRS-ResourceSet ::= | SEQUENCE { |
| ... | |
| usage | ENUMERATED {beamManagement, codebook, nonCodebook, antennaSwitching}, |
| ... | |
| SRS-Resource ::= | SEQUENCE { |
| srs-Resourceid | SRS-ResourceId, |
| nrofSRS-Ports | ENUMERATED {port1, ports2, ports4}, |
| ... | |
| downgradedSRS-TxportSwitch downTx-port2, downTx- port1and2}, antennaSwitching | ENUMERATED {downTx-port1, OPTIONAL, -- Cond |
| ... | |

It is noted that SRS resources are originally configured based on a maximum number of transmit ports among all possible antenna switching configurations indicated by supportedSRS-TxPortSwitch. With a downgraded configuration through the optional RRC parameter downgradedSRS-TxportSwitch, as shown in in Table 4 above, SRS resources can be reused with fewer ports. For example for 't1r1-t1r2-t2r2-t2r4', the maximum number of transmit ports is two, which corresponds to the highest possible configuration 't2r4' configuration.

Further, following the current specification, for each SRS resource in a given set, the SRS port(s) should be associated with different UE antenna port(s) than the SRS port(s) of the other resource(s). The number of configured SRS resources in a set should be defined based on the maximum of number of switching events among all possible antenna switching configurations indicated by supportedSRS-TxPortSwitch. For example, for 't1r1-t1r2-t2r2-t2r4', the maximum antenna switching event is two, which corresponds to the highest possible configuration 't2r4' configuration, while for 't1r1-t1r2-t2r2-t1r4-t2r4', the maximum antenna switching event is four, which corresponds to a downgraded configuration 't1r4'. The number of SRS resources and the number of ports in a set remain the same for the all of the configurations of supportedSRS-TxPortSwitch and the gNB can implicitly indicate/activate a specific configuration through MAC CE or DCI (e.g., by signaling the number of switching events).

For an antenna switching configuration with m switching events (i.e., m resources in a set), the UE uses the predetermined m SRS resources in the given set. For example, the first m SRS resources in the given set are used according to an SRS resource ID order. For an antenna switching configuration with m SRS ports, the UE uses the predetermined m SRS ports in each resource, e.g., the first m SRS ports.

The SRS transmission power should also be adjusted if an SRS resource is configured to be shared among different configurations. To do so, in accordance with an embodiment of the disclosure, a new RRC parameter may be conditionally introduced for antenna switching usage, as shown in Table 5 below, which allows transmit power control adjustment for a downgraded antenna switching configuration.

TABLE 5

| SRS-Config information element | |
|---|---|
| SRS-Config ::= | SEQUENCE { |
| ... | |
| SRS-ResourceSet ::= | SEQUENCE { |
| ... | |
| usage | ENUMERATED {bean-Management, codebook, nonCodebook, antennaSwitching}, |
| ... | |
| SRS-Resource ::= | SEQUENCE { |
| srs-ResourceId | SRS-ResourceId, |
| nrof,SRS-Ports | ENUMERATED {port1, ports2, ports4}, |
| ... | |
| downgradedSRS-TxportSwitch | ENUMERATED {downTx-port1, downTx-port2, downTx-port1and2}, |
| OPTIONAL, -- Cond antennaSwitching | |
| downgradedsrs-PowerControlAdjustmentfactors | ENUMERATED {sameAsFci2,separateClosedLoop,...} OPTIONAL, -- Cond antennaSwitching |
| ... | |

Another method is for the gNB to configure a periodic/semi-persistent set for the highest possible configuration with associated aperiodic SRS resource sets for downgraded configurations. That is, periodic/semi-persistent resources with a large periodicity can be used for antenna switching of a highest possible configuration and aperiodic resource sets for antenna switching of downgraded configurations.

For periodic/semi-persistent SRS antenna switching, an alternative is that gNB may configure one periodic/semi-persistent SRS set with usage of "antennaSwitching" with multiple SRS resources within the set with different number of SRS ports. The higher layer parameters nrofSRS-Ports for each SRS resource in the set are configured based on corresponding possible antenna switching configuration indicated by supportedSRS-TxPortSwitch. For example, for 't1r4-t2r4', the configured nrofSRS-Ports for SRS resources in the set is either one port corresponding to 't1r4' configuration or two ports corresponding to 't2r4' configuration. The gNB can then indicate/activate specific resources in the set (e.g., by indicating the number of transmit ports) depending on channel condition through MAC CE or DCI. It is also possible to let a UE determine the best antenna switching configuration among all possible configurations indicated by supportedSRS-TxPortSwitch and transmit the corresponding SRS resources in the set.

Regarding an aperiodic SRS antenna switching configuration, in a recent standard group meeting, there was an agreement as follows:

Agreement

For aperiodic antenna switching SRS, support to configure N<=N_max resource sets, where totally K resources are distributed in the N resource sets flexibly based on RRC configuration.

For 1 T6R, K=6, N_max=[4], and each resource has 1 port.

For 1 T8R, K=8, N_max=[4], and each resource has 1 port.

For 2T6R, K=3, N_max=[3], and each resource has 2 ports.

For 2T8R, K=4, N_max=[4], and each resource has 2 ports.

(Working Assumption) For 4T8R, K=2, N_max=[2], and each resource has 4 ports.

FFS the number of supported candidate values of N for each xTyR.

FFS extension to increase N_max for 1T4R, 2T4R, T=R and 1T2R cases for aperiodic, periodic and semi-persistent SRS resources FFS the number of resources and resource sets for semi-persistent and periodic antenna switching SRS Note: SRS could be transmitted over the last 6 OFDM symbols, or over any OFDM symbols within the slot subject to UE capability.

Following this agreement, to provide more flexibility on SRS antenna switching configurations, a larger number of aperiodic SRS resource sets should be configured for antenna switching purpose. With flexible antenna switching, on the other hand, multiple resource sets may be configured simultaneously by the gNB corresponding to all possible antenna switching configurations indicated by supportedSRS-TxPortSwitch. Therefore, in accordance with an embodiment of the disclosure, the maximum number of RRC configurable SRS resource sets in one BWP is increased. For example, in Rel. 16, the maximum number of SRS resource sets in a BWP is 16. However, in accordance with an embodiment of the disclosure, this number can be increased to 32 or 64 resource sets.

Further, with an increase of number of configured aperiodic SRS resource sets for antenna switching, it is probable that SRS resource sets configured for a specific antenna switching configuration share the same pathloss reference signal (RS). In such a case, a MAC CE based structure that simultaneously activates/deactivates the pathloss RS for all of the configured SRS sets of a specific configuration can be an overhead efficient approach.

SRS Time Bundling and Increased SRS Repetition

With increasing need of SRS resources for multi-panel transmission, there is higher chance of SRS interference, and consequently, accuracy degradation of uplink channel estimation at a gNB. SRS bundling over multiple SRS slots may improve SRS coverage with the possibility of joint estimation of the uplink channel over different transmissions. With SRS bundling, the channel estimation accuracy may be enhanced on a specific section of BWP. The SRS bundling over different subcarriers can be interpreted as inter-slot frequency hopping in the current specification. The SRS bundling over the same subcarriers may be interpreted as inter-slot repetition.

An aperiodic SRS to bundle can be occasionally transmitted between periodic/semi-persistent SRS transmissions in order to improve channel estimation accuracy.

Figure 3:
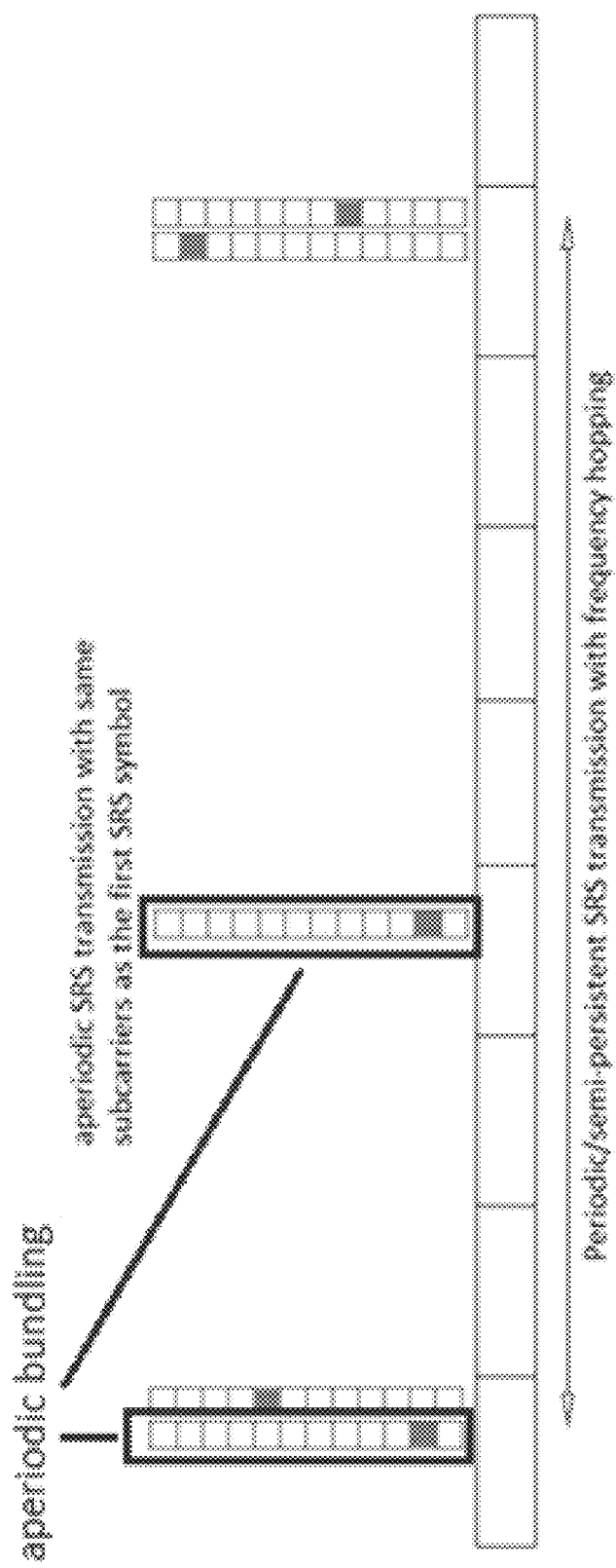
FIG. 3 illustrates an example of aperiodic SRS time bundling over the same subcarriers, according to an embodiment.

FIG. 3 illustrates an example of aperiodic SRS time bundling over the same subcarriers, according to an embodiment.

In accordance with an embodiment of the disclosure, to enhance SRS coverage, the above-described above aperiodic SRS bundling method may be adopted in the specification by allowing associated aperiodic SRS transmission to bundle in between periodic/semi-persistent SRS transmissions.

For aperiodic SRS bundling, it is also possible that all SRS transmissions to bundle are aperiodic resources.

In accordance with an embodiment of the disclosure, to enhance SRS coverage, the above-described aperiodic SRS bundling method may be adopted in the specification.

In both of the aperiodic SRS bundling methods mentioned above, a MAC CE based update of frequency domain parameters can assure that SRS frequency allocation does not change if frequency hopping is enabled For periodic or semi-persistent SRS resources with short periodicity, an SRS time bundling method can be considered by bundling SRS symbols for each periodic instance across multiple slots of periodic/semi-persistent SRS transmissions for specific sections of a BWP.

It is also possible that only some (not necessarily all) symbols for each periodic instance are bundled across multiple periods. In this scenario, a time gap between two SRS transmissions to bundle may be equal to the SRS periodicity.

Figure 4:
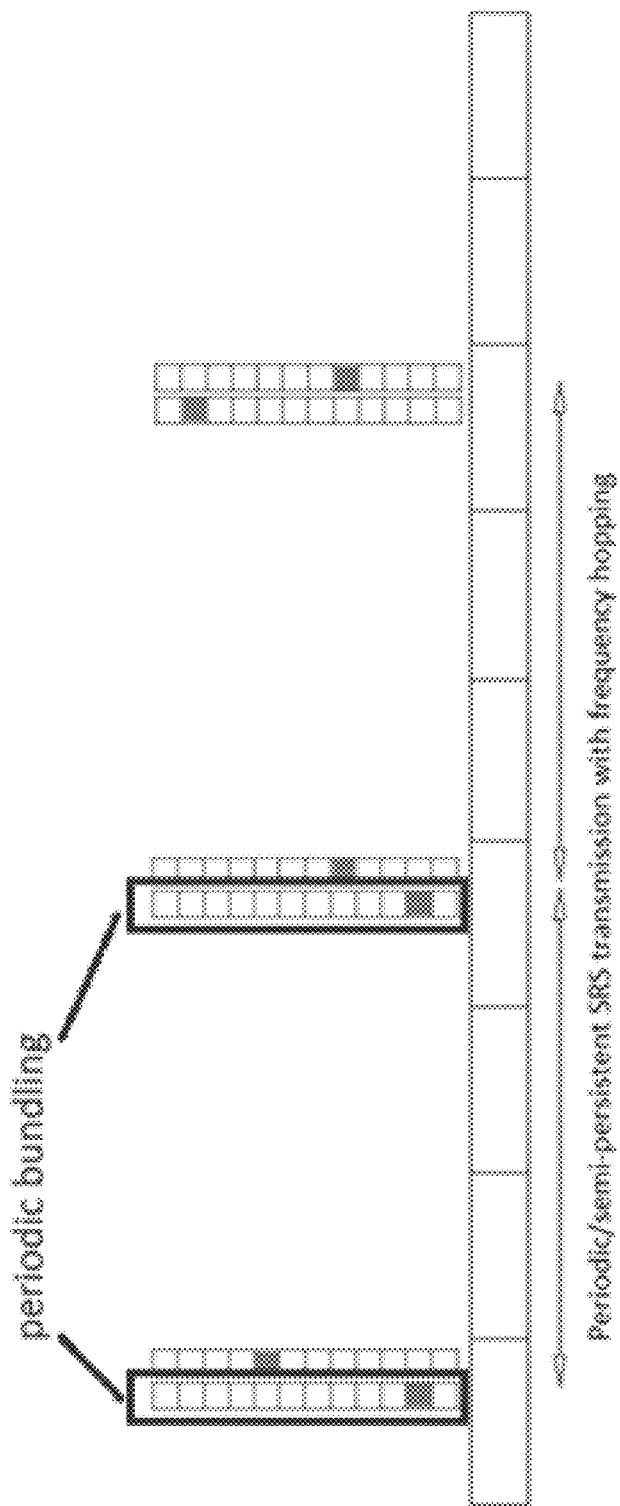
FIG. 4 illustrates an example of periodic/semi-persistent SRS time bundling over the same subcarriers, according to an embodiment.

FIG. 4 illustrates periodic/semi-persistent SRS time bundling over same subcarriers, according to an embodiment.

In accordance with an embodiment of the disclosure, to enhance SRS coverage, the above-described periodic/semi-persistent SRS bundling method may be adopted in the specification by introducing new RRC parameters in a periodic/semi-persistent SRS resource configuration, such as a bundling indicator and/or a bundling factor.

As described above, the frequency domain starting position $k_0^{(pi)}$ equation is dependent on count of number of SRS transmissions $n_{SRS}$. Further, TS 38.211, Section 6.4.1.4.3 provides.

For the case of an SRS resource configured as periodic or semi-persistent by the higher-layer parameter resourceType, the SRS counter is given by $$n_{SRS} = \left( \frac{N_{slot}^{frame,\mu} n_f + n_{s,f}^\mu - T_{offset}}{T_{SRS}} \right) \cdot \left( \frac{N_{symb}^{SRS}}{R} \right) + \left\lfloor \frac{l'}{R} \right\rfloor$$

for slots that satisfy $(N_{slot}^{frame,\mu} n_f + n_{s,f}^\mu - T_{offset})$ mod-$T_{SRS}=0$. The periodicity $T_{SRS}$ in slots and slot offset $T_{offset}$ are given in clause 6.4.1.4.4.

For SRS bundling, the $n_{SRS}$ equation can be enhanced for SRS symbols in the slot that are being bundled in order to assure SRS frequency allocation does not change when frequency hopping is enabled.

In accordance with an embodiment of the disclosure, new RRC parameters bundlingSymbols and bundlingFactor in freqHopping as shown in Table 6 below, and then the equation for counting the number of SRS transmissions $n_{SRS}$ in the section 6.4.1.4.3 of TS 38.211 may be enhanced as shown below.

TABLE 6

SRS-Config information element

| | |
|---|---|
| freqHopping | SEQUENCE { |
|     c-SRS | INTEGER (0..63), |
|     b-SRS | INTEGER (0..3), |
|     b-hop | INTEGER (0..3) |
|     bundlingSymbols | ENUMERATED {0, 1, 2, 3, {0,1}, {0,2}, {0,3}, {1,2}, {1,3}, {2,3}, {0,1,2}, {0,1,3}, {1,2,3}, {0,1,2,3}} |
|     bundlingFactor | INTEGER (1..B) |
| }, | |

In view of the foregoing, TS 38.211, Section 6.4.1.4.3 may be amended to provide:

For the case of an SRS resource configured as periodic or semi-persistent by the higher-layer parameter resourceType, the SRS counter is given by $$n_{SRS} = \begin{cases} \left\lfloor \frac{\left\lfloor \frac{N_{slot}^{frame,\mu} n_f + n_{s,f}^{\mu} - T_{offset}}{T_{SRS}} \right\rfloor}{BF} \right\rfloor \cdot \left(\frac{N_{symb}^{SRS}}{R}\right) + \left\lfloor \frac{l'}{R} \right\rfloor & l' \in BS \\ \left(\frac{N_{slot}^{frame,\mu} n_f + n_{s,f}^{\mu} - T_{offset}}{T_{SRS}}\right) \cdot \left(\frac{N_{symb}^{SRS}}{R}\right) + \left\lfloor \frac{l'}{R} \right\rfloor & \text{others} \end{cases}$$

for slots that satisfy $(N_{slot}^{frame,\mu} n_f + n_{s,f}^{\mu} - T_{offset}) \bmod T_{SRS} = 0$. BF is given by the higher-layer parameter bundlingFactor and BS is given by the higher-layer parameter bundlingSymbols. The periodicity $T_{SRS}$ in slots and slot offset $T_{offset}$ are given in clause 6.4.1.4.4.

An SRS bundling method can also be considered in a way that each SRS transmission can be accompanied with additional SRS slot(s) with configured slot offsets. These additional SRS slot(s) may be triggered and transmitted along with regular SRS resource transmission to be bundled all together, thereby improving channel estimation accuracy. It is also possible that only certain symbols in SRS slot are bundled.

Figure 5:
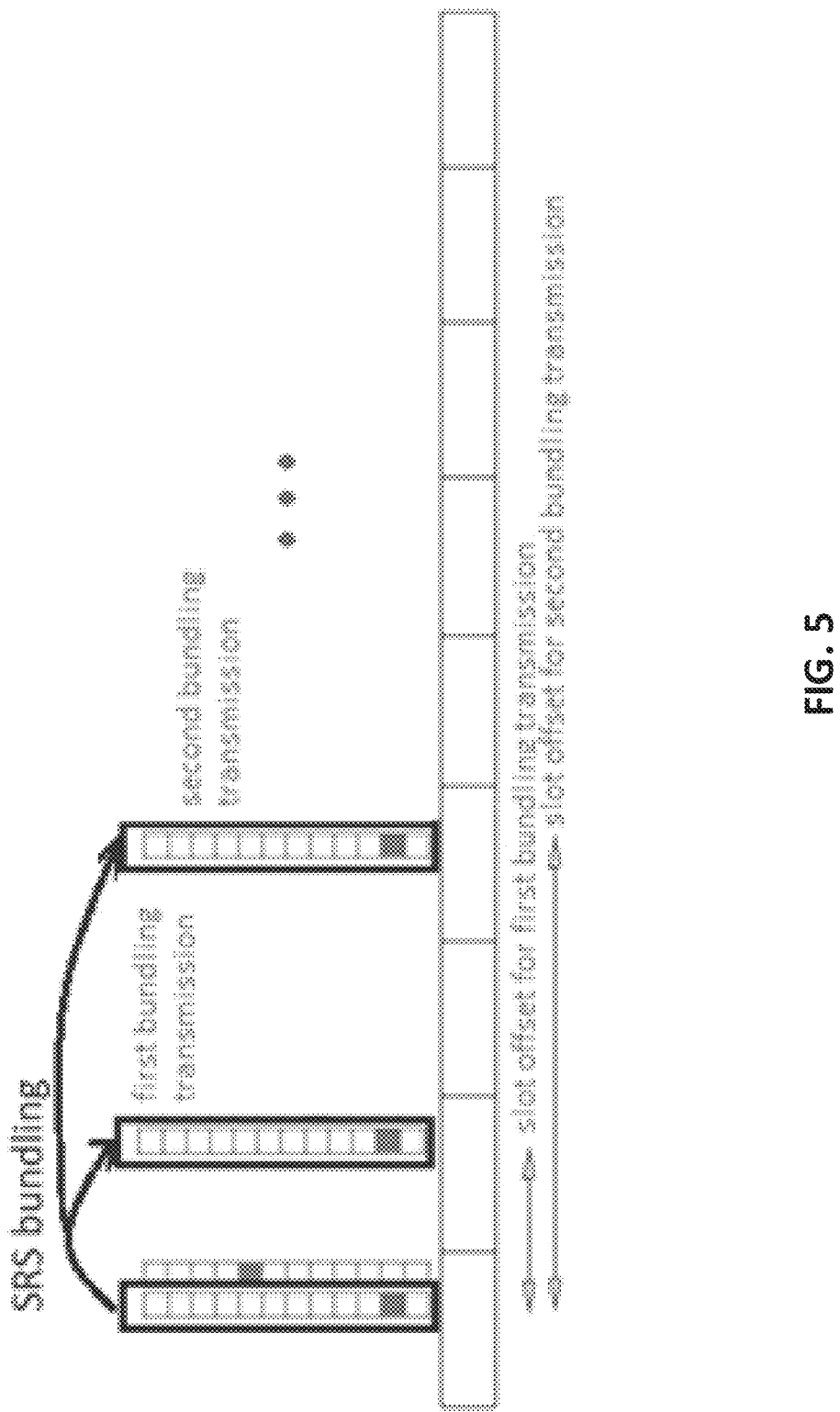
FIG. 5 illustrates an example of SRS time bundling with additional accompanied SRS slots transmission, according to an embodiment.

FIG. 5 illustrates an example of SRS time bundling with additional accompanied SRS slots transmission, according to an embodiment.

In accordance with an embodiment of the disclosure, to enhance SRS coverage, the above-described SRS bundling method may be adopted in the specification by introducing new RRC parameters for each SRS transmission, such as bundling, which includes parameters bundlingSymbols, bundlingFactor, and bundlingslotOffsets.

In current specification, there are $N_{symb}^{SRS} \in \{1,2,4,8,12\}$ consecutive orthogonal frequency division multiplexing (OFDM) symbols in each SRS slot, while the current repetition factor is limited to $R \in \{1,2,4\}$ symbols in TS 38.214. However, with an increased nrofSymbols (i.e., $N_{symb}^{SRS}$), it is also possible to allow larger repetition factors, which can improve SRS coverage.

In accordance with an embodiment of the disclosure, to enhance SRS coverage, a larger repetionFactor may allowed for increased nrofSymbols. For example, the configurable repetionFactor in a slot for a given SRS resource can be increased to $R \in \{1,2,4,8,12\}$ symbols.

In support of inter-slot SRS repetition on non-consecutive symbols across slots (this can also be interpreted as SRS bundling), one method is to configure multiple resources in one set. For each resource in the set, there are associated resources configured in that given set to be used for the repetition. The associated repetition SRS resources are configured in RRC and activated together with the activation of regular SRS resources through a MAC CE (for a semi-persistent SRS set) or DCI (for an aperiodic SRS set).

The frequency allocation of associated repetition SRS resources may change or remain the same as regular SRS transmission. The position of associated repetition SRS symbols can be explicitly indicated using a sequence of individual startPosition RRC parameters or implicitly indicated using an SRS resource level slot/symbol offsets indication from the reference SRS symbol through a new additional RRC parameter. Table 7 below provides an example of an RRC configuration according to an embodiment of the disclosure.

As shown in Table 7, the associated repetition SRS resources are configured inside a reference SRS resource through a new RRC parameter, RepetitionSRS-ResourceIdList, using a list of SRS resource IDs. A slot offset of associated repetition SRS resources to a reference SRS resource are configured through a new RRC parameter, repetitionSlotOffset, within reference SRS resource configuration. The associated repetition SRS resources are transmitted according to the resource ID order with indicated slot offset in repetitionSlotOffset.

TABLE 7

SRS-Config information element

| | |
|---|---|
| SRS-Config ::= | SEQUENCE { |
| SRS-Resource ::= | SEQUENCE { |
|   resourceMapping | SEQUENCE { |
|     repetitionFactor | ENUMERATED {n1, n2, n4, n8, n12}, |
|     RepetitionSRS-ResourceIdList OPTIONAL | SEQUENCE (SIZE(repetitionFactor-1)) OF SRS-ResourceId |
|     repetitionSlotOffset | SEQUENCE(SIZE(repetitionFactor-1)) OF INTEGER (1..maxRepetitionSlotOffset-1) OPTIONAL |
| }, | |

While the current specification indicates the maximum number of SRS resources in a set is no more than two resources for "codebook" usage and no more than four resources for "nonCodebook", "antennaSwitching", and "beamManagement" usages, utilizing SRS-Config information element shown in Table 7, for inter-slot SRS repetition on non-consecutive symbols, the maximum number of SRS resources in a set may be increased for repetition purposes.

As an alternative to introducing a notion of repetition, a slot level offset parameter may be added inside each SRS resource, e.g., as shown in Table 8 below. In the current spec, all resources in one set are transmitted in the same slot. Therefore, by introducing slot level offset, multiple SRS resources can be transmitted in multiple different slots, effectively realizing the purpose of inter-slot repetition. A UE may not know association among SRS resources for the purpose of repetition. Alternatively, such association may be implicitly identified by the same QCL association.

Another alternative is that multiple resources in one set can be configured and activated by a gNB for repetition purposes, without explicit RRC configured association of SRS resources. A UE can implicitly determine the SRS repetition resources through an SRS resource level slot/symbol offset RRC parameter, which is an optional parameter that is configured when an SRS resource is a repetition SRS resource. The slot/symbol offset value of zero is an indicator of a reference SRS resource and all the corresponding repetition SRS resources have the same startPosition RRC parameter as the reference SRS resource. In this method, with a resource level slot offset indicator, the location of the first SRS symbol stays the same across different slots, while with a resource level symbol offset indicator, the location of the first SRS symbol may vary across different slots of inter-slot repetition. An example is illustrated below, where the location of the first SRS symbol does not change across different slots.

TABLE 8

| SRS-Config information element | |
| --- | --- |
| SRS-Config ::= | SEQUENCE { |
| ... | |
| SRS-Resource ::= | SEQUENCE { |
| ... | |
| resourceMapping | SEQUENCE { |
| ... | |
| repetitionFactor | ENUMERATED {n1, n2, n4, n8,n12}, |
| repetitionSlotOffset | INTEGER (0..maxRepetitionSlotOffset) OPTIONAL |
| }, | |
| ... | |

For SRS repetition on consecutive symbols, in accordance with an embodiment of the disclosure, a new RRC configuration is introduced for SRS repetition, where there are two options of intra-slot repetition and inter-slot repetition. The intra-slot repetition is same as SRS repetition in the current specification. The inter-slot repetition can span over multiple consecutive slots, where in each slot there are multiple consecutive repetition SRS symbols with an individual repetition factor and an individual start position of repetition symbols. More specifically, a new RRC parameter is introduced for indication of number of consecutive slots and another new RRC parameter is introduced for indication of position of first repetition SRS symbol for each slot. As shown in Table 9, an RRC configuration is provided, where parameter slotRepetitionFactor configures number of consecutive slots, repetitionFactor configures a sequence of repetition factors for all slots of inter-slot repetition, and symbolOffset configures a sequence of symbol offsets of the first SRS symbol on each slot from the first SRS symbol on the first slot.

TABLE 9

| SRS-Config information element | |
| --- | --- |
| SRS-Config ::= | SEQUENCE { |
| ... | |
| SRS-Resource ::= | SEQUENCE { |
| ... | |
| resourceMapping | SEQUENCE { |
| ... | |
| startPosition | INTEGER (0..5), |
| repetition | CHOICE { |
| intra-slot | SEQUENCE { |
| repetitionFactor | ENUMERATED {n1, n2, n4, n8, n121} |
| }, | |
| inter-slot | SEQUENCE { |
| slotRepetitionFactor | ENUMERATED {2, 3, 4,...} |
| repetitionFactor | SEQUENCE (slotRepetitionFactor) OF {n1, n2, n4, n8, n12} |
| symbolOffset | SEQUENCE (slotRepetitionFactor-1) OF INTEGER (1..maxRepetitionSymbolOffset-1 |
| } | |
| }, | |
| ... | |

The position of first repetition SRS symbol for each of the consecutive slots can alternatively be indicated using the startPosition RRC parameter individually, instead of a symbol offset indication from the first SRS symbol of first slot. Another alternative is that the repetition factor and start position of SRS symbols remain constant over all consecutive slots in inter-slot repetition. An RRC configuration example of this method is shown below in Table 10.

TABLE 10

| SRS-Config information element | |
| --- | --- |
| SRS-Config ::= | SEQUENCE { |
| ... | |
| SRS-Resource ::= | SEQUENCE { |
| ... | |
| resourceMapping | SEQUENCE { |
| ... | |
| startPosition | INTEGER (0..5), |
| repetition | CHOICE { |
| intra-slot | SEQUENCE { |
| repetitionFactor | ENUMERATED {n1, n2, n4, n8, n12} |
| }, | |
| inter-slot | SEQUENCE { |
| slotRepetitionFactor | ENUMERATED {2, 3, 4,...} |
| repetitionFactor | ENUMERATED {n1, n2, n4, n8, n12} |
| } | |
| }, | |
| ... | |

For the above-described inter-slot methods, if hopping is enabled, the quantity R (i.e., repetition factor) in any hopping equation, is the sum of all RRC configured repetition factor values of all slots in an inter-slot repetition.

Flexible Aperiodic (AP)-SRS Triggering

Another point of interest in the enhancements on MIMO relates to enhancements on aperiodic SRS triggering in order to facilitate more flexible triggering and/or DCI overhead/usage reduction. For example, in a recent standards group meeting the following agreement was reached:

Agreement

A given aperiodic SRS resource set is transmitted in the (t+1)-th available slot counting from a reference slot, where t is indicated from DCI, or RRC (if only one value oft is configured in RRC), and the candidate values oft at least include 0. Adopt at least one of the following options for the reference slot.

Opt. 1: Reference slot is the slot with the triggering DCI.
Opt. 2: Reference slot is the slot indicated by the legacy triggering offset.

FFS the detailed definition of "available slot" considering UE processing complexity and timeline to determine available slot, potential co-existence with collision handling, etc., e.g., Based on only RRC configuration, "available slot" is the slot satisfying: there are UL or flexible symbol(s) for the time-domain location(s) for all the SRS resources in the resource set and it satisfies the minimum timing requirement between triggering PDCCH and all the SRS resources in the resource set FFS explicit or implicit indication of t FFS whether updating candidate triggering offsets in MAC CE may be beneficial For Opt. 2, a UE may receive the slot level offset in a two-level offset configuration with more flexible triggering and less overhead and latency. In NR, the maximum triggering offset for SRS is 32 slots. Consequently, if the triggering offset of an SRS transmission is only indicated by DCI, at least 5 bits are required. Further, if the triggering offset for each SRS resource set is indicated separately, the overhead for the triggering offset indications would be large (e.g., 5*N, where N is the number of the SRS resource sets that can be triggered), which is not acceptable.

Additionally, in Opt. 2, the triggering offset indicated by DCI is an offset in addition to the triggering offset indicated by RRC for each SRS resource set. This allows SRS transmissions corresponding to different SRS resource sets to be transmitted in different slots.

An available slot is a slot that first, meets the minimum time gap requirement from the triggering physical downlink control channel (PDCCH), and second, has sufficient UL symbols for all of the SRS resources of the triggered AP-SRS set. A flexible slot can be considered as an available slot. However, after a missing dynamic DL scheduling by a UE, this slot should be unavailable while the UE still determines it as an available slot.

To address this issue, a gNB can indicate a triggering slot offset and an available slot to the UE by using a bitmap structure. That is, the concept of a triggering offset and an available slot can be combined together, and the (t+1)-th available slot is indicated to the UE with a bitmap structure through DCI. This method can be generally implemented for both Opt. 1 and Opt. 2, however, it is more compatible and feasible with Opt. 2 due to advantage of overhead efficiency.

An alternative method is to always consider flexible slots as available slot, regardless of dynamic DL scheduling. If a gNB is aware that a UE counts any flexible slot as an available slot, then there is no misunderstanding between the gNB and the UE. This method can be robust; however, it may introduce some signaling inefficiency. That is, given a constant number of allocated bits for signaling, a signaling range of a triggering offset can be reduced because of extra-counting of unavailable flexible slots (i.e., dynamically DL scheduled slots).

Regarding aperiodic SRS triggering, for DCI format 0_1, a gNB cannot trigger SRS without data scheduling and a CSI request. However, in accordance with an embodiment of the disclosure, the Rel. 16 DCI format 0_1 can be enhanced to support aperiodic SRS triggering without data scheduling and a CSI request. This enhancement can be done with no change to a DCI payload size.

Some of the bit fields of the non-scheduling DCI can be repurposed to allow SRS transmission. For example, the UL-SCH indicator would use value "0" indicating that the UL-SCH will not be transmitted on a physical uplink shared channel (PUSCH).

A frequency domain resource assignment field in DCI format 0_1 allocates a set of resource blocks for a PUSCH. Since there would be no scheduled data for SRS triggering, this field can be repurposed to indicate aperiodic SRS triggering offset(s). Similarly, time domain resource assignment field can be repurposed for aperiodic SRS triggering without scheduled data. This field in DCI format 0_1 can take up to four bits and defines a pointer towards a row within a RRC configured look-up table indicating a PUSCH mapping type, a slot offset, a starting symbol, and a number of allocated symbols. A modulation and coding scheme (MCS) field takes five bits in DCI format 0_1 and defines a pointer towards row within a relevant MCS look-up table. Antenna ports field is used to indicate logical antenna ports for PUSCH transmission and it takes up to five bits. All these fields can be repurposed for aperiodic SRS triggering.

Since more than one aperiodic SRS can be triggered in a single DCI with an SRS request codepoint, an efficient method is to indicate SRS slot offset(s) using a bitmap structure within these repurposed fields of DCI format 0_1.

An example of reusing DCI format 0_1 for AP-SRS triggering with repurposed fields is described below.

In the current specification, RRC configured look-up tables indicating a PUSCH mapping type, a slot offset, a starting symbol, and a number of allocated symbols have a last row reserved. The time domain resource assignment field in DCI format 0_1 may be used to point to the last row (e.g., '11111') and this combined with value "0" of a UL-SCH indicator can be an implicit indication that this DCI format 0_1 is being used for AP-SRS triggering and the field of frequency domain resource assignment is a bitmap for slot offset(s) of the triggered SRS.

In accordance with an embodiment of the present disclosure, a new radio network temporary identifier (RNTI) can be introduced for DCI format 0_1 in order to flexibly trigger AP-SRS resource sets. An RNTI has a length of 16 bits and is allocated by a gNB within a radio access network (RAN) and known by both a UE and the gNB. The RNTI is used to differentiate and identify a specific UE, group of UEs or all UEs. The RNTI is used by a UE to scramble cyclic redundancy check (CRC) bits attached to a DCI payload and provide UL/DL control information, such as resource allocation, power control commands, slot format changes, and system information updates.

Accordingly, a gNB can configure a UE with a new RNTI (i.e., AP-SRS-RNTI) via an RRC configuration through an IE PhysicalCellGroupConfig. The aperiodicSRS-ResourceTrigger and DCI triggering offset value can be derived once an SRS request field in DCI format 0_1 is CRC scrambled with this new RNTI (i.e., AP-SRS-RNTI).

More than one aperiodic SRS may be triggered in one single DCI based on an SRS request codepoint and configured aperiodicSRS-Resource Trigger or aperiodicSRS-ResourceTriggerList values. Each one of these triggered AP-SRS sets may have different slot offsets. In order to indicate all of the different slot offsets in one DCI, a specific number of bits may be assigned for each SRS set's slot offset indicated by DCI and the corresponding slot offsets bits of different SRS sets are sorted according to the SRS set ID in one DCI.

An alternative is to introduce a new RRC parameter, namely, dci-slotOffsetID, for aperiodic SRS sets in an SRS-Config IE in order to arrange the transmission order of all SRS sets with the same configured value of aperiodicSRS-Resource Trigger or aperiodicSRS ResourceTriggerList. Accordingly, each SRS set's slot offset is indicated by a specific number of bits that are sorted in one DCI according to RRC configured dci-slotOffsetID values, as shown in Table 11.

A low overhead alternative method for indicating all of the different slot offsets in one DCI is use a bitmap structure. With the bitmap approach, a gNB should prioritize transmission of triggered AP-SRS sets either based on an SRS set ID or same as before, based on an RRC configured value such as dci-slotOffsetID. Otherwise, the order of SRS sets transmission in those indicated slot locations by the bitmap also needs to be indicated in the DCI. For examples, if three different aperiodic SRS sets with the same value of aperiodicSRS-ResourceTrigger are triggered together and the transmission of the triggered SRS sets are prioritized based on SRS set ID, a bitmap structure of "0001010001" can be used to indicate slot offset values of 4, 6, and 10 corresponding to those three triggered sets in one DCI, where the slot offset of 4 corresponds to the SRS set with the lowest set ID, the slot offset of 6 corresponds to the SRS set with the second lowest set ID, and the slot offset of 10 corresponds to the SRS set with the highest set ID.

As described above, in order to reduce the overhead of an aperiodic SRS set configuration for "antennaSwitching" usage, a resource-level slot offset can be introduced individually for each SRS resource inside an aperiodic SRS resource set in addition to the RRC configured set-level slot offset. The DCI-based flexible triggering of such an aperiodic SRS set can be through either a bitmap structure or an assignment of a specific number of bits for each resource-level slot offset, within the repurposed fields of DCI format 0_1 with the introduction of a new RNTI.

For the former method, a sequence of resource-level slot offsets are indicated with a bitmap structure for each triggered aperiodic SRS set, where each of those slot offsets corresponds to one of the configured resources in that triggered set. For example, for a triggered aperiodic SRS set with four configured resources, a bitmap structure of "0100100101" can be used to indicate four slot offset values of 2, 5, 8 and 10.

For the latter method, however, a gNB assigns a specific number of bits for the slot offset of each configured resources in the triggered aperiodic SRS set. The arrangement of these resource-level slot offsets in both methods above, can be performed through the introduction of a new RRC parameter, namely, dci-resourceslotOffsetID, as shown in Table 12 below, for resources of an aperiodic SRS set in SRS-Config IE. The same dci-resourceslotOffsetID can be assigned to multiple resources indicating that those resources are transmitted in the same slot.

TABLE 11

| SRS-Config information element |
| --- |
| SRS-Config ::=          SEQUENCE { |
|     ... |
|     resourceType          CHOICE { |
|         aperiodic          SEQUENCE { |
|             aperiodicSRS-ResourceTrigger    INTEGER (1..maxNrofSRS-TriggerStates-1), |
|             dci-slotOffsetID         INTEGER (1..maxNrofSRSTriggered)    OPTIONAL, |
|             csi-RS             NZP-CSI-RS-ResourceId    OPTIONAL, -- Cond NonCodebook |
|             slotOffset           INTEGER (1..32)       OPTIONAL, -- Need S |
|             [[ |
|             aperiodicSRS-ResourceTriggerList-v1530     SEQUENCE (SIZE(1..maxNrofSRS-TriggerStates-2)) |
|                             OF INTEGER (1..maxNrofSRS-TriggerStates-1) |
| OPTIONAL -- Need M |
|             ]] |
|         }, |
|     ... |

TABLE 12

| SRS-Config information element |
|---|
| SRS-Config ::=           SEQUENCE { |
| ... |
| SRS-Resource ::=         SEQUENCE { |
|   srs-ResourceId            , |
|   dci-resourceslotOffsetID   INTEGER |
|   (1.. maxNrofSRSResourcesTriggered) OPTIONAL, -- Cond aperiodic |
|   nrofSRS-Ports              ENUMERATED {port1, ports2, ports4}, |
| ... |

Another method for addressing the arrangement order of slot offsets of SRS resources of triggered AP-SRS set in the DCI is to use an SRS resource ID. This method, however, is mostly practical for a specific bit assignment scheme. With this approach, each SRS resource has a specific number of bits for a slot offset indication that are sorted in the DCI according to the SRS resource ID.

Multiple aperiodic SRS sets can be triggered in one DCI with the same configured value of aperiodicSRS-Resource Trigger or aperiodicSRS ResourceTriggerList. The arrangement order of slot offsets in a single DCI can be addressed with the same approaches explained above. A new RRC parameter, namely, dci-resourceslotOffsetID, can be introduced for all resources of all triggered aperiodic SRS sets. The same dci-resourceslotOffsetID value indicates that same slot transmission. The configured dci-resourceslotOffsetID of the SRS resources can be continuously increased across sets. For example, if the first set has three resources with dci-resourceslotOffsetID values of 0, 1, and 1 (i.e., the second and third resources are transmitted in the same slot), the dci-resourceslotOffsetID values for the second set would be greater than or equal to 1.

Alternatively, the configured dci-resourceslotOffsetID of the SRS resources for each set can start from zero (i.e., re-started across SRS sets) and then the actual transmission order of the SRS resource l in SRS set i can be computed implicitly by Equation (8) below.

$$\sum_{j=0}^{i-1}\left(1 + \max_{k}(\mathit{OffsetID}_{j,k})\right) + \mathit{OffsetID}_{i,l} \quad (8)$$

In Equation (8), $\mathit{OffsetID}_{m,n}$ is the value of the configured dci-resourceslotOffsetID for the SRS resource n in the triggered SRS resource set m and the triggered SRS sets are organized (i.e., numbered from zero) according to their SRS set ID.

For specific bit assignment, an alternative is that the arrangement order of slot offsets of all triggered aperiodic SRS resources in the DCI is based on an SRS resource ID and an SRS set ID. That is, the arrangement is such that, first, the slot offsets of resources of the lowest set ID are sorted according to their resource ID, following with slot offsets of resources of the second lowest set ID, and so on. For example, when two SRS sets with IDs of 2 and 8 are triggered, where SRS set #2 has three resources with IDs 1, 4, and 7 and the SRS set #8 has two resources with IDs 2 and 4, the slot offsets of all these five triggered aperiodic resources are sorted as: resource #1 (of set #2), resource #4 (of set #2), resource #7 (of set #2), resource #2 (of set #8), and resource #4 (of set #8).

If the resource-level slot offset method is only introduced for the usage of "antennaSwitching", then the arrangement order of slot offsets in one DCI for multiple triggered AP-SRS sets with different usages can be determined according to new RRC parameters dci-resourceslotOffsetID for aperiodic SRS resources with usage of "antennaSwitching" and dci-slotOffsetID, for aperiodic SRS sets with usages other than "antennaSwitching". The values of configured dci-slotOffsetID and dci-resourceslotOffsetID are continuously configured based on the gNB prioritization of SRS transmissions.

The group common DCI has a potential benefit of less DCI size budget as compared with a UE specific DCI. This is applicable for SRS triggering for multiple UEs.

DCI format 2_3 is a group common DCI format that was introduced in NR Rel-15 for SRS carrier switching. DCI format 2_3 is used to trigger aperiodic SRS resource set(s) with 'antenna switching' usage for UL carriers without PUSCH/PUCCH configured for group of UEs. However, DCI format 23 is only used for carrier switching where a UE switches from a serving cell to another cell without PUSCH/PUCCH configured or another UL on which SRS power control is noted tied with PUSCH power control.

Similarly to the method described above, a new RNTI, namely, AP-SRS-RNTI, can be introduced for DCI format 2_3 in order to flexibly trigger AP-SRS resource sets without PUSCH for other purpose than carrier switching. The gNB can configure the UE with this new RNTI via an RRC configuration through an IE PhysicalCellGroupConfig.

Specifically, an IE AP-SRS-CommandConfig may be defined to configure the UE for extracting commands for flexible AP-SRS triggering from a group message on DCI format 2_3, as shown in Table 13 below.

TABLE 13

| AP-SRS-CommandConfig information element | | | |
|---|---|---|---|
| AP-SRS-CommandConfig ::= | SEQUENCE { | | |
|   startingBitOfFormat2-3 | INTEGER (1.31) | OPTIONAL, | -- Need R |
| ..., | | | |
| [[ | | | |
| startingBitOfFormat2-3SUL-v1530 | INTEGER (1..31) | OPTIONAL | -- Need R |
| ]] | | | |

In Table 13, startingBitOfFormat2-3 is an index for the location of a first bit for a field for a non-supplementary uplink carrier of the serving cell, and startingBitOfFormat2-3SUL-v1530 is an index for the location of a first bit for a field for a supplementary UL carrier of the serving cell.

The following may be extracted from the DCI format 2_3 with a CRC scrambled by AP-SRS-RNTI:

block number 1, block number 2, . . . , block number B

The starting position of each block is determined by the higher layer parameters of AP-SRS-CommandConfig for the UE that is configured with that block.

For each block, the following fields are defined:

SRS request—0 or 2 bits. The codepoint 00 is used when no aperiodic SRS resource set is triggered and other codepoints are used to trigger SRS resource set(s) according to the configured aperiodicSRS-Resource-Trigger or aperiodicSRS-ResourceTriggerList values.

AP-SRS slot offset-n bits. Each SRS set has m allocated bits to indicate its own slot offset. Different SRS sets' bits are sorted according to an SRS set ID.

Alternatively, a new RRC parameter, dci-slotOffsetID, may be introduced for each aperiodic SRS set in an SRS-Config IE and different SRS sets' bits are sorted in an AP-SRS slot offset field of each block according to the configured dci-slotOffsetID values.

In NR Rel. 16, AP-SRS can also be triggered by DCI format 1_1, as well as DCI format 0_1. Similar method as discussed above for DCI format 0_1 can be applied to DCI format 1_1 for aperiodic SRS triggering. Additionally, a new RNTI can also be introduced for DCI format 1_1 to flexibly trigger AP-SRS resource sets.

Figure 6:
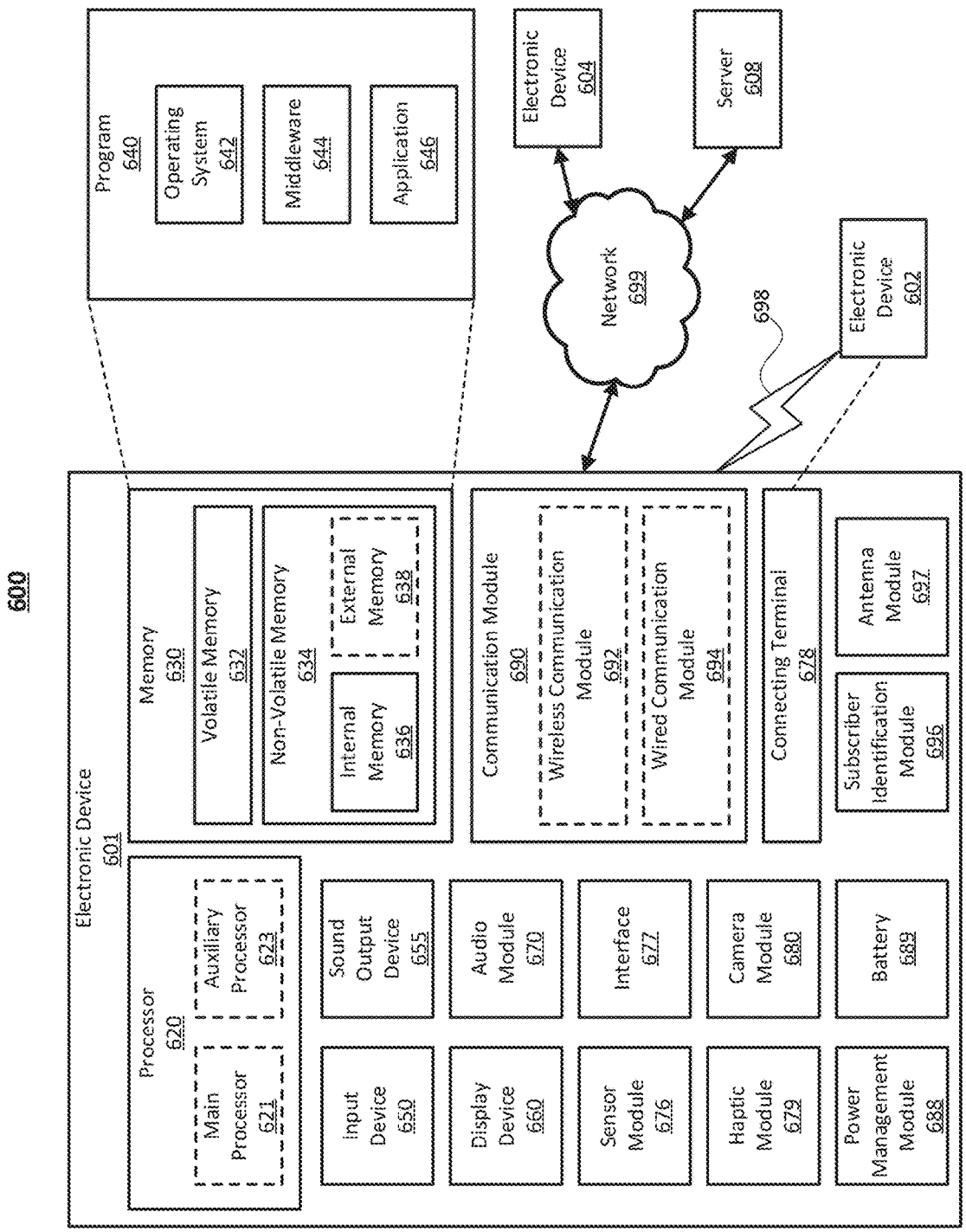
FIG. 6 illustrates an electronic device in a network environment, according to an embodiment.

FIG. 6 illustrates an electronic device in a network environment, according to an embodiment.

Referring to FIG. 6, the electronic device 601, e.g., a mobile terminal including GPS functionality, in the network environment 600 may communicate with an electronic device 602 via a first network 698 (e.g., a short-range wireless communication network), or an electronic device 604 or a server 608 via a second network 699 (e.g., a long-range wireless communication network). The electronic device 601 may communicate with the electronic device 604 via the server 608. The electronic device 601 may include a processor 620, a memory 630, an input device 650, a sound output device 655, a display device 660, an audio module 670, a sensor module 676, an interface 677, a haptic module 679, a camera module 680, a power management module 688, a battery 689, a communication module 690, a subscriber identification module (SIM) 696, or an antenna module 697 including a GNSS antenna. In one embodiment, at least one (e.g., the display device 660 or the camera module 680) of the components may be omitted from the electronic device 601, or one or more other components may be added to the electronic device 601. In one embodiment, some of the components may be implemented as a single integrated circuit (IC). For example, the sensor module 676 (e.g., a fingerprint sensor, an iris sensor, or an illuminance sensor) may be embedded in the display device 660 (e.g., a display).

The processor 620 may execute, for example, software (e.g., a program 640) to control at least one other component (e.g., a hardware or a software component) of the electronic device 601 coupled with the processor 620, and may perform various data processing or computations. As at least part of the data processing or computations, the processor 620 may load a command or data received from another component (e.g., the sensor module 676 or the communication module 690) in volatile memory 632, process the command or the data stored in the volatile memory 632, and store resulting data in non-volatile memory 634. The processor 620 may include a main processor (e.g., a central processing unit (CPU) or an application processor, and an auxiliary processor (e.g., a graphics processing unit (GPU), an image signal processor (ISP), a sensor hub processor, or a communication processor (CP)) that is operable independently from, or in conjunction with, the main processor 621.

Additionally or alternatively, the auxiliary processor may be adapted to consume less power than the main processor 621, or execute a particular function. The auxiliary processor 623 may be implemented as being separate from, or a part of, the main processor 621.

The auxiliary processor 623 may control at least some of the functions or states related to at least one component (e.g., the display device 660, the sensor module 676, or the communication module 690) among the components of the electronic device 601, instead of the main processor while the main processor 621 is in an inactive (e.g., sleep) state, or together with the main processor 621 while the main processor 621 is in an active state (e.g., executing an application). According to one embodiment, the auxiliary processor 623 (e.g., an image signal processor or a communication processor) may be implemented as part of another component (e.g., the camera module 680 or the communication module 690) functionally related to the auxiliary processor 623.

The memory 630 may store various data used by at least one component (e.g., the processor or the sensor module 676) of the electronic device 601. The various data may include, for example, software (e.g., the program 640) and input data or output data for a command related thereto. The memory 630 may include the volatile memory 632 or the non-volatile memory 634.

The program 640 may be stored in the memory 630 as software, and may include, for example, an operating system (OS) 642, middleware 644, or an application 646.

The input device 650 may receive a command or data to be used by other component (e.g., the processor 620) of the electronic device 601, from the outside (e.g., a user) of the electronic device 601. The input device 650 may include, for example, a microphone, a mouse, or a keyboard.

The sound output device 655 may output sound signals to the outside of the electronic device 601. The sound output device 655 may include, for example, a speaker or a receiver. The speaker may be used for general purposes, such as playing multimedia or recording, and the receiver may be used for receiving an incoming call. According to one embodiment, the receiver may be implemented as being separate from, or a part of, the speaker.

The display device 660 may visually provide information to the outside (e.g., a user) of the electronic device 601. The display device 660 may include, for example, a display, a hologram device, or a projector and control circuitry to control a corresponding one of the display, hologram device, and projector. According to one embodiment, the display device 660 may include touch circuitry adapted to detect a touch, or sensor circuitry (e.g., a pressure sensor) adapted to measure the intensity of force incurred by the touch.

The audio module 670 may convert a sound into an electrical signal and vice versa. According to one embodiment, the audio module 670 may obtain the sound via the input device 650, or output the sound via the sound output device 655 or a headphone of an external electronic device 602 directly (e.g., wiredly) or wirelessly coupled with the electronic device 601.

The sensor module 676 may detect an operational state (e.g., power or temperature) of the electronic device 601 or an environmental state (e.g., a state of a user) external to the electronic device 601, and then generate an electrical signal or data value corresponding to the detected state. The sensor module 676 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 677 may support one or more specified protocols to be used for the electronic device 601 to be coupled with the external electronic device 602 directly (e.g., wiredly) or wirelessly. According to one embodiment, the interface 677 may include, for example, a high definition multimedia interface (HDMI), a universal serial bus (USB) interface, a secure digital (SD) card interface, or an audio interface.

A connecting terminal 678 may include a connector via which the electronic device 601 may be physically connected with the external electronic device 602. According to one embodiment, the connecting terminal 678 may include, for example, an HDMI connector, a USB connector, an SD card connector, or an audio connector (e.g., a headphone connector).

The haptic module 679 may convert an electrical signal into a mechanical stimulus (e.g., a vibration or a movement) or an electrical stimulus which may be recognized by a user via tactile sensation or kinesthetic sensation. According to one embodiment, the haptic module 679 may include, for example, a motor, a piezoelectric element, or an electrical stimulator.

The camera module 680 may capture a still image or moving images. According to one embodiment, the camera module 680 may include one or more lenses, image sensors, image signal processors, or flashes.

The power management module 688 may manage power supplied to the electronic device 601. The power management module 688 may be implemented as at least part of, for example, a power management integrated circuit (PMIC).

The battery 689 may supply power to at least one component of the electronic device 601. According to one embodiment, the battery 689 may include, for example, a primary cell which is not rechargeable, a secondary cell which is rechargeable, or a fuel cell.

The communication module 690 may support establishing a direct (e.g., wired) communication channel or a wireless communication channel between the electronic device 601 and the external electronic device (e.g., the electronic device 602, the electronic device 604, or the server 608) and performing communication via the established communication channel. The communication module 690 may include one or more communication processors that are operable independently from the processor 620 (e.g., the application processor) and supports a direct (e.g., wired) communication or a wireless communication. According to one embodiment, the communication module 690 may include a wireless communication module 692 (e.g., a cellular communication module, a short-range wireless communication module, or a global navigation satellite system (GNSS) communication module) or a wired communication module 694 (e.g., a local area network (LAN) communication module or a power line communication (PLC) module). A corresponding one of these communication modules may communicate with the external electronic device via the first network 698 (e.g., a short-range communication network, such as Bluetooth™, wireless-fidelity (Wi-Fi) direct, or a standard of the Infrared Data Association (IrDA)) or the second network 699 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 692 may identify and authenticate the electronic device 601 in a communication network, such as the first network 698 or the second network 699, using subscriber information (e.g., international mobile subscriber identity (IMSI)) stored in the subscriber identification module 696.

The antenna module 697 may transmit or receive a signal or power to or from the outside (e.g., the external electronic device) of the electronic device 601. According to one embodiment, the antenna module 697 may include one or more antennas, and, therefrom, at least one antenna appropriate for a communication scheme used in the communication network, such as the first network 698 or the second network 699, may be selected, for example, by the communication module 690 (e.g., the wireless communication module 692). The signal or the power may then be transmitted or received between the communication module 690 and the external electronic device via the selected at least one antenna.

At least some of the above-described components may be mutually coupled and communicate signals (e.g., commands or data) therebetween via an inter-peripheral communication scheme (e.g., a bus, a general purpose input and output (GPIO), a serial peripheral interface (SPI), or a mobile industry processor interface (MIPI)).

According to one embodiment, commands or data may be transmitted or received between the electronic device 601 and the external electronic device 604 via the server 608 coupled with the second network 699. Each of the electronic devices 602 and 604 may be a device of a same type as, or a different type, from the electronic device 601. All or some of operations to be executed at the electronic device 601 may be executed at one or more of the external electronic devices 602, 604, or 608. For example, if the electronic device 601 should perform a function or a service automatically, or in response to a request from a user or another device, the electronic device 601, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 601. The electronic device 601 may provide the outcome, with or without further processing of the outcome, as at least part of a reply to the request. To that end, a cloud computing, distributed computing, or client-server computing technology may be used, for example.

One embodiment may be implemented as software (e.g., the program 640) including one or more instructions that are stored in a storage medium (e.g., internal memory 636 or external memory 638) that is readable by a machine (e.g., the electronic device 601). For example, a processor of the electronic device 601 may invoke at least one of the one or more instructions stored in the storage medium, and execute it, with or without using one or more other components under the control of the processor. Thus, a machine may be operated to perform at least one function according to the at least one instruction invoked. The one or more instructions may include code generated by a complier or code executable by an interpreter. A machine-readable storage medium may be provided in the form of a non-transitory storage medium. The term "non-transitory" indicates that the storage medium is a tangible device, and does not include a signal (e.g., an electromagnetic wave), but this term does not differentiate between where data is semi-permanently stored in the storage medium and where the data is temporarily stored in the storage medium.

According to one embodiment, a method of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., Play Store), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to one embodiment, each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In this case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

As described above, the embodiments of the disclosure utilize SRS bundling to improve SRS coverage with possibility of joint estimation of the uplink channel over different transmissions, allow for larger configurable repetition factor and larger comb size, which can enhance SRS coverage, use partial sounding across frequencies, which can enhancement the capacity and coverage of SRS transmission, provide additional specifications for antenna switching configurations and flexible antenna switching, provide flexible and dynamic triggering of aperiodic SRS transmission, and reduce signaling overhead of aperiodic SRS transmissions by repurposing bit fields of the non-scheduling DCI.

Although certain embodiments of the present disclosure have been described in the detailed description of the present disclosure, the present disclosure may be modified in various forms without departing from the scope of the present disclosure. Thus, the scope of the present disclosure shall not be determined merely based on the described embodiments, but rather determined based on the accompanying claims and equivalents thereto.

What is claimed is:

1. A base station apparatus for wireless communication with a user equipment (UE), the base station apparatus comprising:
a transceiver; and
a processor configured to:
transmit, to the LE, via the transceiver, a control message configured for the UE, and
receive, via the transceiver, a sounding reference signal (SRS) from the LTE, based on the control message,
wherein the control message indicates a triggering slot offset and an available slot to the UE for the SRS transmission, and
wherein the available slot satisfies the UE's capability on a minimum timing requirement between triggering a physical downlink control channel (PDCCH) and all SRS resources in a resource set.

2. The base station apparatus of claim 1, wherein the control message utilizes a bitmap structure.

3. The base station apparatus of claim 1, wherein the control message includes at least one of a radio resource control (RRC) message or a downlink control information (DCI) message.

4. The base station apparatus of claim 1, wherein the processor is further configured to instruct the UE to consider all flexible slots as available slots, regardless of dynamic downlink scheduling.

5. The base station apparatus of claim 1, wherein the processor is further configured to configure at least one bit field of a non-scheduling downlink control information (DCI) to indicate an aperiodic SRS triggering offset.

6. The base station apparatus of claim 5, wherein the least one bit field comprises at least one of a frequency domain resource assignment field, a time domain resource assignment field, a modulation and coding scheme field, or an antenna port field in DCI format 0_1 or DCI format 1_1.

7. The base station apparatus of claim 1, wherein the processor is further configured to configure the UE with an aperiodic (AP)-SRS-radio network temporary identifier (RNTI) via a radio resource control (RRC) configuration.

8. The base station apparatus of claim 1, wherein the processor is further configured to, when at least two aperiodic SRS sets are triggered in a single downlink control information (DCI) message, generate the control message to include an SRS configuration information element including a dci-slotOffsetliD radio resource control (RRC) parameter.

9. The base station apparatus of claim 8, wherein the processor is further configured to prioritize transmission of triggered AP-SRS sets in the bitmap structure, based on the dci-slotOffsoID.

10. The base station apparatus of claim 1, wherein the processor is further configured to:
receive, via the transceiver, a UE capability message from the UE, and
generate the control message, based on the UE capability message.

11. The base station apparatus of claim 1, wherein the processor is further configured to prioritize transmission of triggered aperiodic (AP)-SRS sets in the bitmap structure, based on an SRS set identifier.

12. The base station apparatus of claim 1, wherein the processor is further configured to generate the control message to include an aperiodic (AP)-SRS command configuration information element that instructs the LiE to extract commands for flexible AP-SRS triggering from a group message.

13. A user equipment (UE) apparatus for wireless communication with a base station, the UE apparatus comprising:
a transceiver; and
a processor configured to:
receive, from the base station, via the transceiver, a control message configured for the UE, and
transmit, via the transceiver, a sounding reference signal (SRS) to the base station, based on the control message,
wherein the control message indicates a triggering slot offset and an available slot to the LIE for the SRS transmission, and wherein the available slot satisfies the UE's capability on a minimum timing requirement between triggering a physical downlink control channel (PDCCH) and all SRS resources in a resource set.

14. The UE apparatus of claim 13, wherein the control message utilizes a bitmap structure.

15. The UE apparatus of claim 13, wherein the control message includes at least one of a radio resource control (RRC) message or a downlink control information (DCI) message.

16. The UE apparatus of claim 13, wherein the processor is further configured to configure the UE to consider all flexible slots as available slots, regardless of dynamic downlink scheduling.

17. The UE apparatus of claim 13, wherein at least one bit field of a non-scheduling downlink control information (DCI) of the control message indicates an aperiodic SRS triggering offset.

18. The UE apparatus of claim 17, wherein the least one bit field comprises a at least one of frequency domain resource assignment field, a time domain resource assignment field, a modulation and coding scheme field, or an antenna port field in DCI format 0_1 or DCI format 1_1.

19. The UE apparatus of claim 13, wherein the processor is further configured to identify an aperiodic (AP)-SRS-radio network temporary identifier (RNTI) via a radio resource control (RRC) configuration of the control message.

20. The UE apparatus of claim 13, wherein the processor is further configured to, when at least two aperiodic SRS sets are triggered in a single downlink control information (DCI) message, identify an SRS configuration information element including a dci-slotOffsetID radio resource control (RRC) parameter in the control message.

21. The UE apparatus of claim 20, wherein the processor is further configured to prioritize transmission of triggered AP-SRS sets in the bitmap structure, based on the dci-slotOffsetID.

22. The UE apparatus of claim 13, wherein the processor is further configured to:
  transmit, via the transceiver, a LE capability message to the base station, and
  receive the control message generated, by the base station, based on the UE capability message.

23. The UE apparatus of claim 13, wherein the processor is further configured to prioritize transmission of triggered aperiodic (AP)-SRS sets in the bitmap structure, based on an SRS set identifier.

24. The UE apparatus of claim 13, wherein the processor is further configured to identify, in the control message, an aperiodic (AP)-SRS command configuration information element that instructs the UE to extract commands for flexible AP-SRS triggering from a group message.

* * * * *

UNITED STATES PATENT AND TRADEMARK OFFICE
CERTIFICATE OF CORRECTION

Page 1 of 1

PATENT NO. : 11,876,742 B2
APPLICATION NO. : 17/329735
DATED : January 16, 2024
INVENTOR(S) : Hoda Shahmohammadian et al.

It is certified that error appears in the above-identified patent and that said Letters Patent is hereby corrected as shown below:

In the Claims

In Claim 1, Column 33, Line 61:
"transmit, to the LE, via the transceiver, a control"
Should be:
-- transmit, to the UE, via the transceiver, a control --

In Claim 1, Column 33, Line 64:
"(SRS) from the LTE, based on the control message,"
Should be:
-- (SRS) from the UE, based on the control message --

In Claim 12, Column 34, Line 52:
"ration information element that instructs the LiE to extract"
Should be:
-- ration information element that instructs the UE to extract --

In Claim 13, Column 34, Line 66:
"offset and an available slot to the LIE for the SRS"
Should be:
-- offset and an available slot to the UE for the SRS --

In Claim 22, Column 36, Line 13:
"transmit, via the transceiver, a LE capability message to"
Should be:
-- transmit, via the transceiver, a UE capability message to --

Signed and Sealed this
Twenty-fourth Day of December, 2024

Derrick Brent
*Acting Director of the United States Patent and Trademark Office*